(12) United States Patent
Matsuda et al.

(10) Patent No.: US 7,663,799 B2
(45) Date of Patent: Feb. 16, 2010

(54) DISPLAY APPARATUS

(75) Inventors: Hiroshi Matsuda, Isehara (JP); Taro Endo, Kawasaki (JP); Kohei Nagayama, Kawasaki (JP); Tsutomu Ikeda, Hachiohji (JP); Etsurō Kishi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 10/552,996

(22) PCT Filed: Sep. 29, 2004

(86) PCT No.: PCT/JP2004/014705

§ 371 (c)(1),
(2), (4) Date: Oct. 10, 2006

(87) PCT Pub. No.: WO2005/031452

PCT Pub. Date: Apr. 7, 2005

(65) Prior Publication Data
US 2007/0109622 A1 May 17, 2007

(30) Foreign Application Priority Data
Sep. 30, 2003 (JP) ............................ 2003-340312
May 25, 2004 (JP) ............................ 2004-154719

(51) Int. Cl.
G02B 26/00 (2006.01)

(52) U.S. Cl. ........................................ 359/296; 359/290

(58) Field of Classification Search .......... 359/295–298
See application file for complete search history.

(56) References Cited

U.S. PATENT DOCUMENTS 6,166,787 A * 12/2000 Akins et al. .................. 349/57
6,239,896 B1    5/2001  Ikeda ......................... 359/240
6,524,153 B1    2/2003  Ikeda et al. ................... 445/24
6,639,580 B1   10/2003  Kishi et al. .................. 345/107
6,729,924 B2    5/2004  Ikeda et al. ................... 445/24
2002/0030785 A1*  3/2002  Enomoto et al. ............ 349/156
2003/0048521 A1*  3/2003  Ikeda et al. .................. 359/296
2003/0227436 A1  12/2003  Ikeda ........................ 345/107

FOREIGN PATENT DOCUMENTS

JP       11-109392       4/1999
JP       11109392 A  *  4/1999
JP     2003/167107       6/2003

* cited by examiner

Primary Examiner—Jessica T Stultz
Assistant Examiner—Mahidere S Sahle
(74) Attorney, Agent, or Firm—Fitzpatrick, Cella, Harper & Scinto

(57) ABSTRACT

A movable particle display (such as an electrophoretic display) in which a plurality of closed spaces are two-dimensionally disposed along a surface of the substrate, a plurality of particles contained in each of the closed spaces, and a reflection surface for reflecting light which enters each of the closed particles are moved inside a closed space, between a position at which they cover a reflecting surface and a position at which they are collected to expose the reflecting surface. At least a part of the reflecting surface diffusely reflects incident light with an intensity distribution having directional properties (i.e. non-isotropically). The intensity of the diffusely reflected light has an angular distribution such that: (1) the amount of light reflected toward the position at which the particles are collected is smaller than in the case when the distribution of diffusely reflected light is isotropic, and (2) the amount of light reflected away from the position at which the particles are collected is larger than that of light reflected towards that position.

11 Claims, 11 Drawing Sheets

(A)

(B)

DISPLAY APPARATUS

TECHNICAL FIELD

The present invention relates to a display apparatus that effects display by moving particles.

BACKGROUND ART

In recent years, as an example of a particle-movement type display apparatus that effects display by moving particles, an electrophoretic display apparatus designed to effect display by moving electrophoretic particles under application of a voltage has been actively studied.

Such an electrophoretic display apparatus includes a pair of substrates disposed with a spacing therebetween, an insulating liquid and electrophoretic particles which are disposed in the spacing, and a pair of electrodes disposed close to the insulating liquid. The electrophoretic display apparatus has, compared with a liquid crystal display apparatus (device), various advantages, such as a high display contrast, a wide viewing angle, a display memory characteristic, an elimination of the need for a backlight and a polarizing plate, etc.

However, the electrophoretic display apparatus effects display by reflecting external incident light, so that an amount of external light incident thereon is decreased when an illuminance of the external light is low, e.g., the electrophoretic display apparatus is used indoors or during the night. As a result, the display state is very dark, so that the electrophoretic display apparatus has a disadvantage of lowering its viewability. For this reason, the electrophoretic display apparatus is required to increase a reflectance so as to efficiently reflect the incident external light.

In a reflection type liquid crystal display apparatus which effects display by reflecting external light incident thereon similarly as in the electrophoretic display apparatus in order to retain an enlarged viewing angle and enhance a reflectance, Japanese Laid-Open Patent Application No. Hei 11-109392 has proposed a structure in which a reflection electrode at each pixel is provided with a portion with a directivity with respect to the incident external light and a portion exhibiting a mirror surface characteristic.

In such a structure, light fluxes, of the incident external light, which enter the portion of the reflectance electrode having the mirror surface characteristic are regularly reflected by the reflection electrode, so that all the light fluxes are moved outside a liquid crystal cell. As a result, it is possible to increase a reflectance and a contrast. Light fluxes which enter the portion of the reflection electrode having the directivity are scattered by the reflection electrodes and moved in the scattering direction to increase an outgoing angle, thus keeping an enlarged viewing angle.

Similarly, when such a structure for reflecting the light is employed in the electrophoretic display apparatus, it is possible to increase the reflectance. FIGS. 13(A) and 13(B) are schematic views showing a structure of one pixel in the case where a scattering layer of such a conventional reflection type liquid crystal display apparatus is employed in an electrophoretic display apparatus, wherein FIG. 13(A) is a plan view of the pixel and FIG. 13(B) is a sectional view of the pixel along X-Y line shown in FIG. 13(A).

Referring to these figures, the electrophoretic display apparatus includes a first substrate 1A and a second substrate 2A which are disposed opposite to each other with a spacing there a closed space, in which an insulating liquid 3 and a plurality of electrophoretic particles 4 are filled, is disposed. In the closed space, a first substrate 25 and a second electrode 26 are disposed close to the insulating liquid 3 and between which a voltage is applied to move the electrophoretic particles 4 toward the first electrode 25 or the second electrode 26, thus effecting display. Between the first electrode 25 and the insulating liquid 3, an isotropic scattering layer 12 is disposed, and a plurality of partition walls 7A are disposed to partition the spacing between the first and second substrates 1A and 2A into a plurality of closed spaces each corresponding to one pixel. Accordingly, each of the partition walls 7A is disposed at a pixel boundary portion so as to partition the spacing between the first and second substrates 1A and 2A into adjacent two closed spaces. Further, surfaces of the respective electrodes 25 and 26 are appropriately coated with a substantially insulating material (not shown) so as not to directly contact the insulating liquid 3. In the electrophoretic display apparatus described above, the first electrode 25 also functions as a reflection layer.

FIGS. 13(A) and 13(B) shows a bright display state in which the electrophoretic particles s4 are collected in an area close to the second electrode 26 to constitute a light absorbing portion enclosed by a dotted line in FIG. 13(B). In this state, for example, light 8M which enters a portion close to a pixel center portion or the light absorbing portion 13 in a direction of a normal to the substrates is first scattered isotropically by the isotropic scattering layer 12. More specifically, a part of the scattered light moves in a direction toward the first substrate 1A and is reflected by the first electrode 25 which also functions as the reflection layer and then is reflected again isotropically by the isotropic scattering layer 12. As a result, the incident light 8M is changed to reflected light 9M.

However, in such an electrophoretic display apparatus provided with the reflection layer, when light enters a portion close to the light absorbing portion 13, a part of reflected light 9M of the incident light is absorbed by the electrophoretic particles 4 present at the light absorbing portion 13 to lower a reflectance during bright state display in some cases. Further, as shown in FIG. 13(B), in the case where the second electrode 26 is formed in the neighborhood of the partition wall 7A or at the surface of the partition wall 7A, the light absorbing portion 13 and the partition wall 7A are close to each other. For this reason, a reflectance during the bright state display is lowered in some cases due to light absorption by both of the light absorbing portion 13 and the partition wall 8A.

DISCLOSURE OF THE INVENTION

An object of the present invention is to provide a display apparatus capable of effecting bright display without lowering a light reflectance.

According to the present invention, there is provided a display apparatus, comprising:

a substrate on which a plurality of closed spaces are two-dimensionally disposed along a surface of the substrate, a plurality of particles contained in each of the closed spaces, and a reflection surface for reflecting light which enters each of the closed spaces, wherein the particles are moved in each closed space, between a position at which they are diffused to cover the reflection surface and a position at which they are collected to expose the reflection surface, to change an intensity of reflected light so as to provide a bright display state and a dark display state, wherein at least a part of the reflection surface diffuse-reflecting incident light with a directivity when the particles are located at the position at which the reflection surface is exposed, and wherein a light intensity of the diffuse reflection with the directivity has such an angular distribution that:

(1) an amount of reflected light toward the position at which the particles are collected is smaller than that thereof in the case where the reflection surface is an isotropic diffuse reflection surface, and (2) an amount of reflected light toward positions other than the position at which the particles are collected is larger than that of reflected light toward the position at which the particles are collected.

A proportion of a reflected light portion toward the particle collecting portion to the light reflected by the diffuse reflection layer becomes small, so that a proportion of a reflected light portion, which is incident on the particles and absorbed thereby, to the entire light reflected by the diffuse reflection layer also becomes small. Accordingly, it becomes possible to ensure a bright-state luminance larger than that in the case of using a conventional isotropic scattering layer.

According to the present invention, there is also provided a display apparatus, comprising:

a substrate on which a plurality of closed spaces are two-dimensionally disposed along a surface of the substrate, a plurality of particles contained in each of the closed spaces, a partition wall for dividing the closed spaces into each of the closed spaces in a direction along the surface of the substrate, and a reflection surface for reflecting light which enters each of the closed spaces, wherein the particles are moved in each closed space, between a position at which they are diffused to cover the reflection surface and a position at which they are collected to expose the reflection surface, to change an intensity of reflected light so as to provide a bright display state and a dark display state, wherein at least a part of the reflection surface diffuse-reflecting incident light with a directivity when the particles are located at the position at which the reflection surface is exposed, and wherein a light intensity of the diffuse reflection with the directivity has such an angular distribution that:

(1) an amount of reflected light toward the partition wall is smaller than that thereof in the case where the reflection surface is an isotropic diffuse reflection surface, and (2) an amount of reflected light toward portions other than the partition wall is larger than that of reflected light toward the partition wall.

The display apparatus of this type has a cell structure partitioned by the plurality of partition walls and controls a directivity of the diffuse reflection layer so as to decrease a proportion of reflected light moving toward the partition wall, so that a proportion of the reflected light portion, which is incident on the partition wall and absorbed thereby, to the entire light reflected by the diffuse reflection layer also becomes small. Accordingly, similarly as in the above case, it becomes possible to ensure a light-state luminance larger than that in the case of using the conventional isotropic scattering layer.

The reflection surface has a portion close to the position at which the particles are collected or the partition wall, and the directivity at the portion is made stronger than those at other portions of the reflection surface, thus providing the directive diffuse reflection layer with a directivity distribution thereby to further improve a brightness during bright-state display.

The angular distribution of the intensity of light from the reflection surface may preferably be such that it is asymmetrical with respect to a direction of a normal to the reflection surface in an area close to the position at which the particles are collected or the partition wall so as to be localized toward a direction apart from the position or the partition wall and that it is substantially symmetrical with respect to the normal direction in an area other than the area close to the position or the partition wall. As a result, reflection in the neighborhood of the partition wall is effectively shifted toward the pixel center direction.

The reflection surface is divided into a plurality of reflection areas different in reflection characteristic from each other, and the angular distribution of the intensity of light from each of the divided reflection areas is such that it is changed stepwise or continuously from a strong level to a weak level with respect to the directivity with an increasing distance of the particles from the position at which the particles are collected or the partition wall and that it is changed stepwise or continuously from a large level to a small level or no level with respect to the asymmetry with the increasing distance. By doing so, the directivity and changed stepwise or continuously.

It is preferable that the reflection surface is substantially a mirror surface in an area close to the position at which the particles are collected or the partition wall, and is a diffuse reflection surface in an area other than the area close to the position or the partition wall.

At least a portion of the reflection surface in an area close to the position at which the particles are collected or the partition wall is inclined upward the position or the partition wall, whereby it is possible to easily obtain a locarized light intensity angular distribution.

At least a portion of the substrate is made transparent and the reflection surface is made semitransparent, and a light source is disposed below the substrate, whereby it is possible to provide a semitransparent display apparatus.

The apparatus may preferably further comprise a front scattering layer disposed on an observer's side, thus eliminating a metallic feeling.

When the plurality of particles are substantially black and the partition wall has a color substantially identical to a color of the plurality of particles, the partition wall and the particles have the same color. As a result, light absorption during dark-state display is increased to improve a contrast. In each of the closed spaces, a pair of electrodes are disposed and a surface of at least one of the electrodes constitutes at least a portion of the reflection surface, thus realizing a structure which functions as the electrode and the reflection layer in combination.

In each of the closed spaces, a color filter is disposed on the reflection surface, whereby a colored reflection surface is provided.

In each of the closed spaces, a pair of electrodes are disposed and at least one of the electrodes may be transparent and disposed on the reflection surface.

In each of the closed spaces, a color filter may be disposed between the reflection surface and the transparent electrode.

When the plurality of particles are electrically charged particles and are dispersed in an insulating liquid in each of the closed spaces, thus resultant display apparatus becomes an electrophoretic display apparatus.

In the display apparatus according to the present invention, compared with the case of using an ideal isotropic scattering reflection layer, the directivity of the diffuse reflection surface is set so that reflected light fluxes of light reflected at the diffuse reflection surface, which move toward the position at which the plurality of particles are collected or the partition wall during the bright-state display, are decreased in intensity and these which move toward an area other than the position or the partition wall, i.e., toward the observation surface are increased in intensity. As a result, it becomes possible to effect bright display by improving a substantial reflectance.

These and other objects, features and advantages of the present invention will become more apparent upon a consideration of the following description of the preferred embodiments of the present invention taken in conjunction with the accompanying drawings.

BEST MODE FOR CARRYING OUT THE INVENTION

Figure 1:
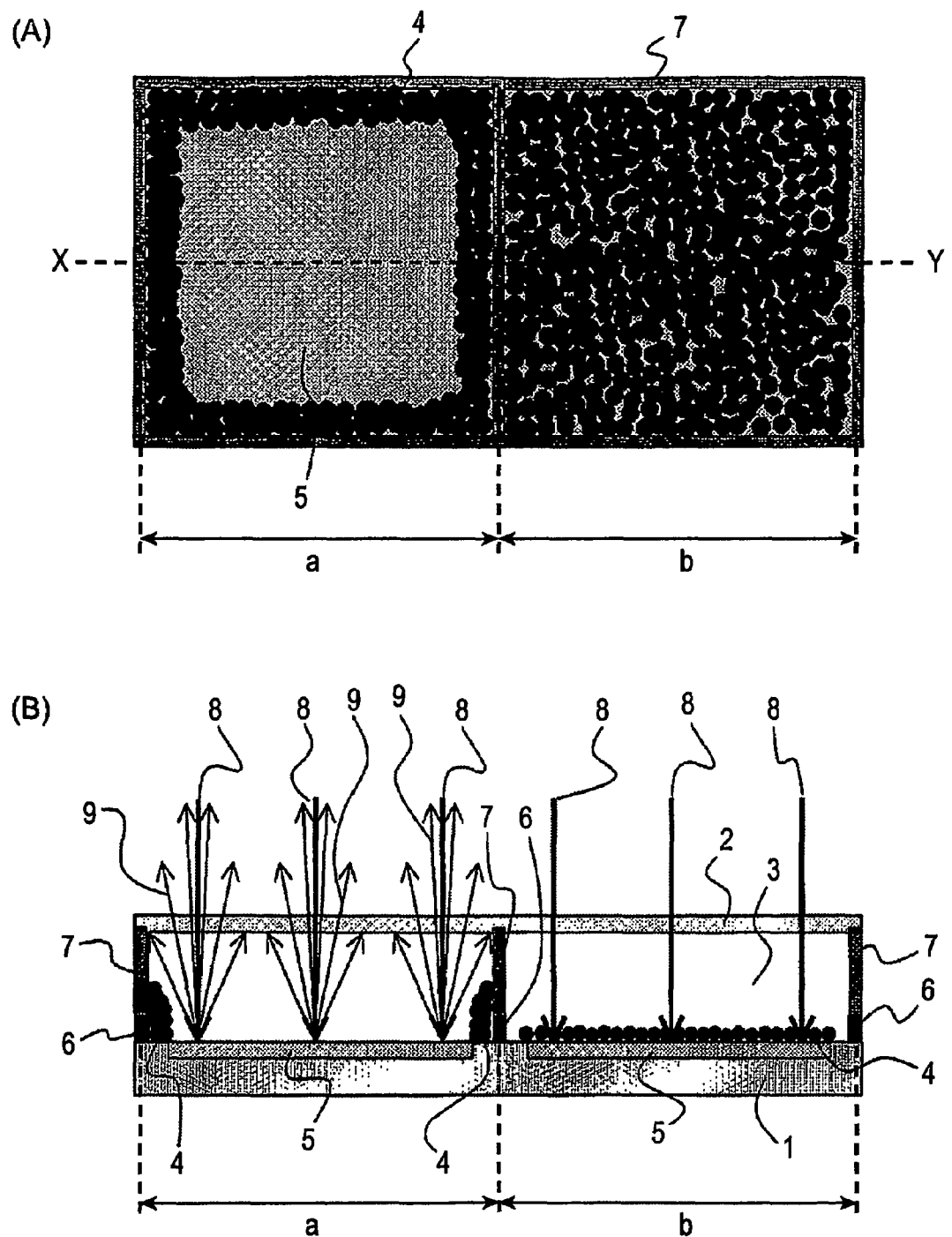
FIGS. 1(A) and 1(B) are views showing a structure of adjacent two pixels of an electrophoretic display apparatus as an embodiment of a particle movement type display apparatus according to First Embodiment of the present invention.

Hereinbelow, seven preferred embodiments for carrying out the present invention will be described with referenced to the drawings.

First Embodiment

FIGS. 1(A) and 1(B) are views showing a structure of adjacent two pixels of an electrophoretic display apparatus as an embodiment of a particle movement type display apparatus according to First Embodiment of the present invention, wherein FIG. 1(A) is a plan view of the pixels, and FIG. 1(B) is a sectional view of the pixels along X-Y line indicated in FIG. 1(A).

Referring to these figures, the electrophoretic display apparatus includes a first substrate 1 and a second substrate 2 which are disposed opposite to each other with a spacing there a closed space, in which an insulating liquid 3 and a plurality of electrophoretic particles 4 are filled, is disposed. In the closed space, a first substrate 5 and a second electrode 6 are disposed close to the insulating liquid 3 and between which a voltage is applied to move the electrophoretic particles 4 toward the first electrode 5 or the second electrode 6, thus effecting display of bright and dark states. A plurality of partition walls 7A are disposed to partition the spacing between the first and second substrates 1 and 2 into a plurality of closed spaces each corresponding to a pixel defined by the first and second substrates 1 and 2 and the partition walls 7. In each space, the insulating liquid 3 and the plurality of electrophoretic particles 4 are sealed. As described above, by partitioning the pixels a and b one by one by the partition walls 7, it is possible to suppress movement of the electrophoretic particles 4, which are movable particles in a pixel (closed space), to adjacent pixels. As a result, the number of the electrophoretic particles 4 in each of the pixels a and b is made substantially equal to each other to permit high-quality display.

In this embodiment, the partition wall 7 are disposed to partition the pixels a and b one by one but may be disposed to partition the pixels so that one pixel is further partitioned into a plurality of sub-pixels or a plurality of pixels constitute one pixel, i.e., the plurality of pixels are disposed between adjacent partition walls 7.

Next, materials and manufacturing methods of the above described first and second substrates 1 and 2, insulating liquid 3, electrophoretic particles 4, first and second electrodes 5 and 6, and partition walls 7 will be described.

As a material for the first and second substrates 1 and 2, it is possible to use a plastic film of polyethylene terephthalate (PET), polycarbonate (PC), polyether sulfone (PES), etc., a glass substrate, a quartz substrate, and so on. On the substrates, an adhesive layer and/or a sealing layer are laminated as desired. It is also possible to use a film of metal, such as stainless steel, as the substrates. In this case, the metal film may appropriately be covered with a surface insulating material. In the case where the display apparatus is a reflection type electrophoretic display apparatus, the second substrate 2 (disposed on the observers side) or its support is required to be formed of a transparent material, but the other substrate (first substrate 1) may b colored substrate, such as a polyimide (PI) film.

As a material for the insulating liquid 3, it is possible to use a transparent nonpolar solvent, such as isoparaffin, silicon oil or xylene.

As a material for the electrophoretic particles 4, it is possible to use a material, which is colored and exhibits a good positive or negative chargeability (electrification characteristic) in the insulating liquid, such as various inorganic or organic pigments, carbon black, resins containing these pigments. The electrophoretic particles 4 may ordinarily have a particle size of about 0.1-10 microns, preferably about 0.5-6 microns from the viewpoint of a dispersibility and a contrast.

In the insulating liquid 3 and the electrophoretic particles 4 described above, it is preferred to add a dispersing agent for preventing agglomeration of the electrophoretic particles 4 and retaining their dispersion state. Examples of the dispersing agent may include polyvalent metal phosphates, such as calcium phosphate and magnesium phosphate; carbonates, such as calcium carbonate; other inorganic salts; inorganic oxides; and organic polymeric materials.

The second electrode 6 may preferably be formed of a patternable electroconductive material including metals, such as titanium (Ti), aluminum (Al), copper (Cu), etc.; carbon paste and silver paste; and organic conductive films. The first electrode 5 may preferably be formed of a high light-reflective material, such as silver or Al. Further, it is preferable that the surfaces of the first and second electrodes 5 and 6 are coated with an insulating layer (not shown) in order to ensure electrical insulation between the electrodes 5 and 6 and prevent electric charge injection from the electrode to the electrophoretic particles 4.

As a material for the partition walls 7, it is possible to use the same material as the substrates or a photosensitive resin, such as acrylic resin. The partition walls 7 may be formed through a method in which a photosensitive resin is applied and subjected to exposure to light and wet development, a method in which a separately prepared barrier wall is bonded, or a printing method. The partition walls 7 may also be integrally formed with the first substrate 1 through hot embossing.

The first electrode 5 has a diffuse reflection function with respect to incident light. Incidentally, for simple explanation, an expression "reflection by (at) an (the) electrode" is used in the following description but is intended to inclusively mean the following cases, such as the case of utilizing a surface reflection characteristic of an objective electrode itself (in combination with an underlying layer, such as an uneven layer for shaping the surface of the electrode in a desired form, as desired); the case of utilizing a diffuse characteristic of, e.g., a volume-phase type hologram or a light-diffuse substance, formed on a electrode placed in a mirror state; and the case where a transparent electrode is further formed of these structures.

In FIGS. 1(A) and 1(B), a first pixel a is in such a state that the electrophoretic particles 4 are collected on the second electrode 6 side (partition wall side), i.e., on the partition wall-side electrode side. In this state, incident light fluxes 8 entering the pixel a (closed space) are reflected by the first electrode 5, respectively, to provide a bright display state. On the other hand, a pixel b is in such a state that the electrophoretic particles 4 are moved along and diffused over the first electrode 5. In this state, the incident light fluxes 8 are generally absorbed by the electrophoretic particles 4 to provide a dark display state.

In this embodiment, the diffuse reflection function of the first electrode 5 is such that, during the bright-state display, a directivity is designed so that an intensity of reflected light moving toward the neighborhood of an area where the electrophoretic particles 4 are collected is smaller than a light intensity in the case where the light is assumed to cause identical isotropic scattering reflection at the reflection surface and is also smaller than an intensity of reflected light 9 moving toward an area other than the particle collection area, i.e., toward the observation surface. For this reason, during the bright-state display, a degree of light absorption by the electrophoretic particles 4 collected in the neighborhood of the partition walls 7 is smaller than that in the case of using the isotropic scattering reflection layer. As a result, it becomes possible to effect bright display at the entire pixels as a whole.

Incidentally, the moving direction of the reflected light 9 varies depending on an incident angle of the incident light 8, so that an angular distribution of the reflected light intensity is dependent on a position of a light source. In other words, in some cases, with a change in the position of the light source, a proportion of light entering the electrophoretic particles 4 can be increased. Accordingly, the directive diffuse reflection characteristic may only be required to realize such an angular distribution of the reflected light intensity that a proportion or an intensity of reflected light moving toward the position at which the electrophoretic particles 4 are collected or the partition wall during the bright-state display in correspondence with a condition of the incident light, such as the position of the light source. In an ordinary use condition of the display apparatus, it is preferable that the directivity is designed so that the diffuse reflection characteristic in the present invention can be obtained with respect to, e.g., incident light moving toward a display (observation) surface, i.e., the second substrate surface of the display apparatus in a direction normal to the substrate or at an incident angle within ±30 degrees on the basis of the normal direction. However, in the present invention, the incident light condition is not limited to the above condition.

Further, in the present invention, the diffuse reflection characteristic has a directivity, so that a reflection intensity varies depending on an observing position of an observer. For this reason, there is also a possibility that a gain of the reflection intensity is not increased at some observing positions and thus bright display is not necessarily effected satisfactorily. Accordingly, in the present invention, the directivity of the diffuse reflection characteristic may be designed so that it provides a brighter state during the bright-state display under a principal observation condition of the display apparatus. More specifically, under an ordinary use condition of the display apparatus, the directivity may be designed so as to provide a bright display state on the precondition that the observer observes the display apparatus from a position providing an angle at least within about ±5 degrees, preferably within about ±30 degrees, with respect to the normal direction to the second substrate 2 surface.

Under a particular use condition, e.g., in the case where the display apparatus is used for advertising display which is hung in or provided at a curved portion close to a top surface of a traffic vehicle, there is a possibility that a position of a light source, i.e., an interior light (lamp) of the traffic vehicle is largely deviated from a direction normal to a display surface of the display apparatus and that an observer observes the display apparatus in a direction deviated from the display surface normal direction. In such a case, the directivity may be set to provide an angular distribution of reflected light intensity such that an intensity of reflected light moving toward the observation surface is larger than that moving toward the position at which the electrophoretic particles are collected and/or the partition wall during the bright-state display in view of a positional relationship between the light source, the display apparatus and the observer. In the following description, however, explanation will be made on the precondition that incident light is dominantly incident from the observation surface normal direction for simple explanation unless otherwise specified.

The first electrode 5 having the diffuse reflection function described above may be formed by any method so long as it is possible to obtain desired scattering characteristic and directivity. Examples of such a method may include a method wherein a surface of glass member is provided with a minute unevenness and subjected to vapor deposition of metal, a method wherein a mixture layer of particles and a resin which are different in refractive index is formed on a metal layer, and a method wherein hologram is prepared by interference exposure.

Figure 2:
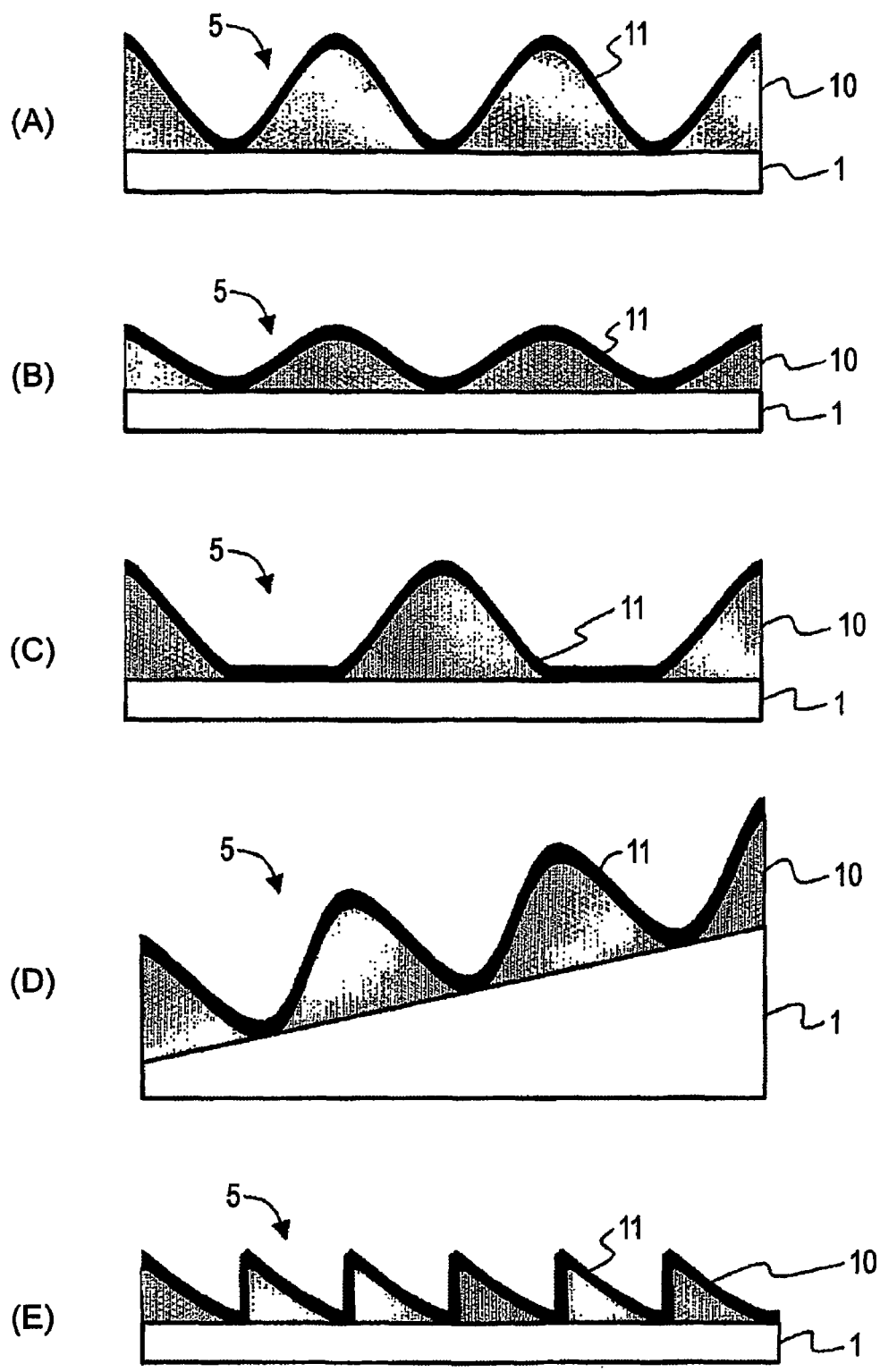
FIGS. 2(A) to 2(E) are views for illustrating a method of forming a first electrode, having a diffuse reflection function, disposed in the electrophoretic display apparatus and a structure for imparting a directivity.

For example, an electrode having the diffuse reflection function (diffuse reflection layer) shown in FIG. 2(A) is formed by first depositing a photosensitive resin on a first substrate 1, subjecting the photosensitive resin to exposure and development to form an uneven layer 10 having a continuous convex and vapor-depositing on the uneven layer 10 a metal layer 11. Between the formation of uneven layer 10 and the vapor deposition of metal layer 11, the surface convex shape of uneven layer 10 may be made moderate by effecting thermal treatment or solvent treatment.

Diffuse reflection layers shown in FIGS. 2(B) and 2(C) are designed to have larger directivities, respectively, than that shown in FIG. 2(A). More specifically, the diffuse reflection layer has the same density of convex of uneven layer 10 as that shown in FIGS. 2(A) but has a height of convex lower than that shown in FIG. 2(A). By designing the diffuse reflection layer so, the resultant diffuse reflection layer has a surface close to a mirror surface, so that reflected light is diffused only in a narrower range. As a result, the directivity is enhanced. On the other hand, the diffuse reflection layer has the same height of convex of uneven layer 10 as that shown in FIG. 2(A) but has a density of convex smaller than that shown in FIG. 2(A). By designing it so, the resultant diffuse reflection layer has a flat area larger than that shown in FIG. 2(A), thus having a structure close to a mirror surface structure to diffuse reflected light in a narrower range. As a result, the directivity is increased. In the diffuse reflection layer shown in FIG. 2(C), the flat area is formed at a lower portion of the convex but may be formed at an upper portion thereof.

A diffuse reflection layer shown in FIG. 2(D) is designed so that it has an inclined surface on which an uneven layer 10 is formed, whereby reflected light can be diffused in an oblique direction range. By designing it so, the resultant diffuse reflection layer can have a reflection characteristic (angular distribution of reflected light intensity) which is shifted in a direction perpendicular to the inclined surface, compared with that shown in FIG. 2(A). As a result, it is possible to impart a directivity different from that of the layer shown in FIG. 2(A) to the diffuse reflection layer when viewed from the observation surface.

Further, a diffuse reflection layer shown in FIG. 2(E) has an uneven layer 10 having an asymmetric convex shape, so that it becomes possible to impart an asymmetrical directivity characteristic similarly as in that shown in FIG. 2(D).

In the layers shown in FIGS. 2(A) to 2(E), a similar uneven layer 10 may also be formed by such a method wherein a flat layer of a pressure-sensitive resin, a thermoplastic resin or a photosensitive resin is formed and then is partially removed or deformed to provide a continuous concave in place of the convex.

Dimension of the convex or the concave, such as height, depth, area, and inclination angle are not necessarily constant so long as a desired optical characteristic can be obtained. For example, it is possible to provide Gaussian distribution in an appropriate range.

Further, the uneven structure is not necessarily periodical. For example, the use of disordered uneven pattern achieves an effect of suppressing an occurrence of moire during display. in the case of the particle movement type display apparatus, the bright/dark state in determined depending on size of developed area of colored particles to be visually identified by the observer. Accordingly, different from the reflection type liquid crystal display apparatus, there is no restriction such that case should be taken so as not to obviate polarization of reflected light during the designing of shape of the diffuse reflection layer. A possibility of an occurrence of operation failure of the electrophoretic particles 4 by the surface unevenness is low, so that in the case where the outermost surface is disposed adjacent to the insulating liquid in which the electrophoretic particles 4 are dispersed, the ensuring of surface flatness is not necessarily required even when the outermost surface may preferably be coated with an insulating material so as not to directly contact the insulating liquid and the electrophoretic particles as described above.

In order to effect white/black display or color display by using the electrophoretic display apparatus having such a structure, it is necessary to appropriately color the electrophoretic particles 4 or another member.

For example, in the case of effecting white/black display, the electrophoretic particles 4 are colored black. The first electrode 5 is not particularly colored when a metal layer of a material, having a mirror surface reflection characteristic, such as aluminum is formed on an uneven layer 10 having an appropriate surface shape. Alternatively, on the metal surface (mirror surface), it is possible to form a volume-phase hologram or a light diffusion layer comprising a resinous binder and fine particles dispersed therein an having a refractive index different therefrom.

Further, in order to suppress particularly that a regular reflection portion visually looks metallic, a front scattering layer such as an antiglare layer may be disposed on the second substrate 2 side.

The partition walls 7 may preferably be colored a color which is substantially identical to that of the electrophoretic particles 4 at least at their surfaces. This is because it is possible to enhance a contrast by suppressing color mixing during the dark-state display. From a similar reason, a spacing between the first electrode 5 and the second electrode 6 is colored the same color as that of the electrophoretic particles 4.

Figure 3:
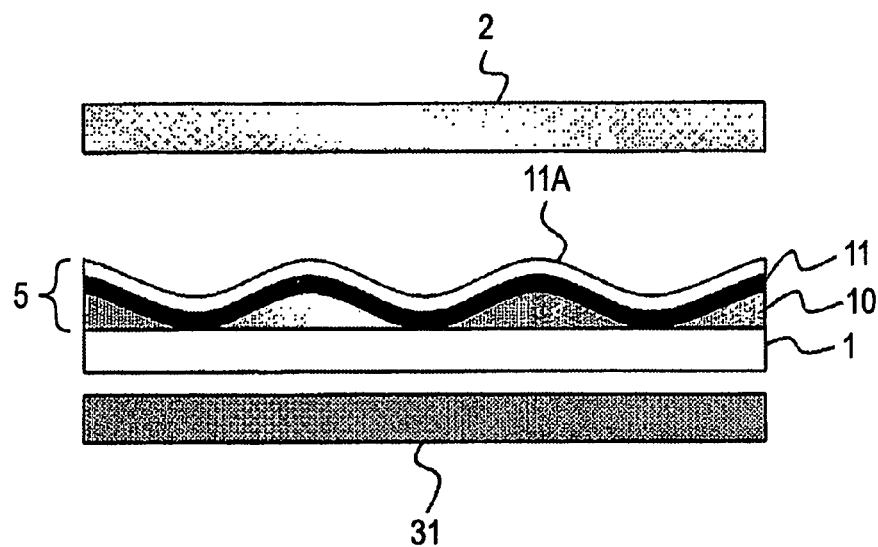
FIG. 3 is a view showing a structure of a first substrate and a first electrode and its neighborhood in the case where the electrophoretic display apparatus is used as a semitransparent type display apparatus.

Further, it is also possible to provide a semi-transparent display apparatus by using a transparent first substrate 1 and a semi-transparent first electrode 5 and disposing a backlight comprising a light source, a light-guiding plate and a prism sheet below the first electrode 5. FIG. 3 shows a schematic view in the neighborhood of the first electrode 5. In this case, an uneven layer 10 is made transparent, a metal layer 11 is made semi-transparent by thinning the layer, and at least a part of light from a backlight 31 is adjusted to move toward a second substrate 2. By controlling the thickness of the metal layer 11, it is possible to control a ratio between a reflectance and a transmittance to a desired value. However, when the thickness of the metal layer 11 is made small, a resultant electroconductivity is lowered to deteriorate a function thereof as an electrode in some cases. In such cases, on the surface of the metal layer 11, a transparent electrode 11A is disposed to constitute the first electrode 5. A material for the transparent electrode 11A may include a known material, such as an inorganic oxide (e.g., ITO or ZnO) or an organic electroconductive material. In FIG. 3, the transparent electrode 11A is directly formed on the metal layer 10 but may be formed through an unshown layer, such as a flattening layer. Further, as described above, on the transparent electrode 11A, when it is disposed adjacent to the insulating liquid 3 in which the electrophoretic particles 4 are dispersed, an insulating layer (not shown) may preferably be formed so as not to directly contact the insulating liquid 3 and the electrophoretic particle 4.

In this embodiment, the second electrode 6, as shown in FIG. 1, is disposed between the partition wall 7 and the first substrate 1 but may be formed in the partition wall 7 or at the surface of the partition wall 7.

Figure 4:
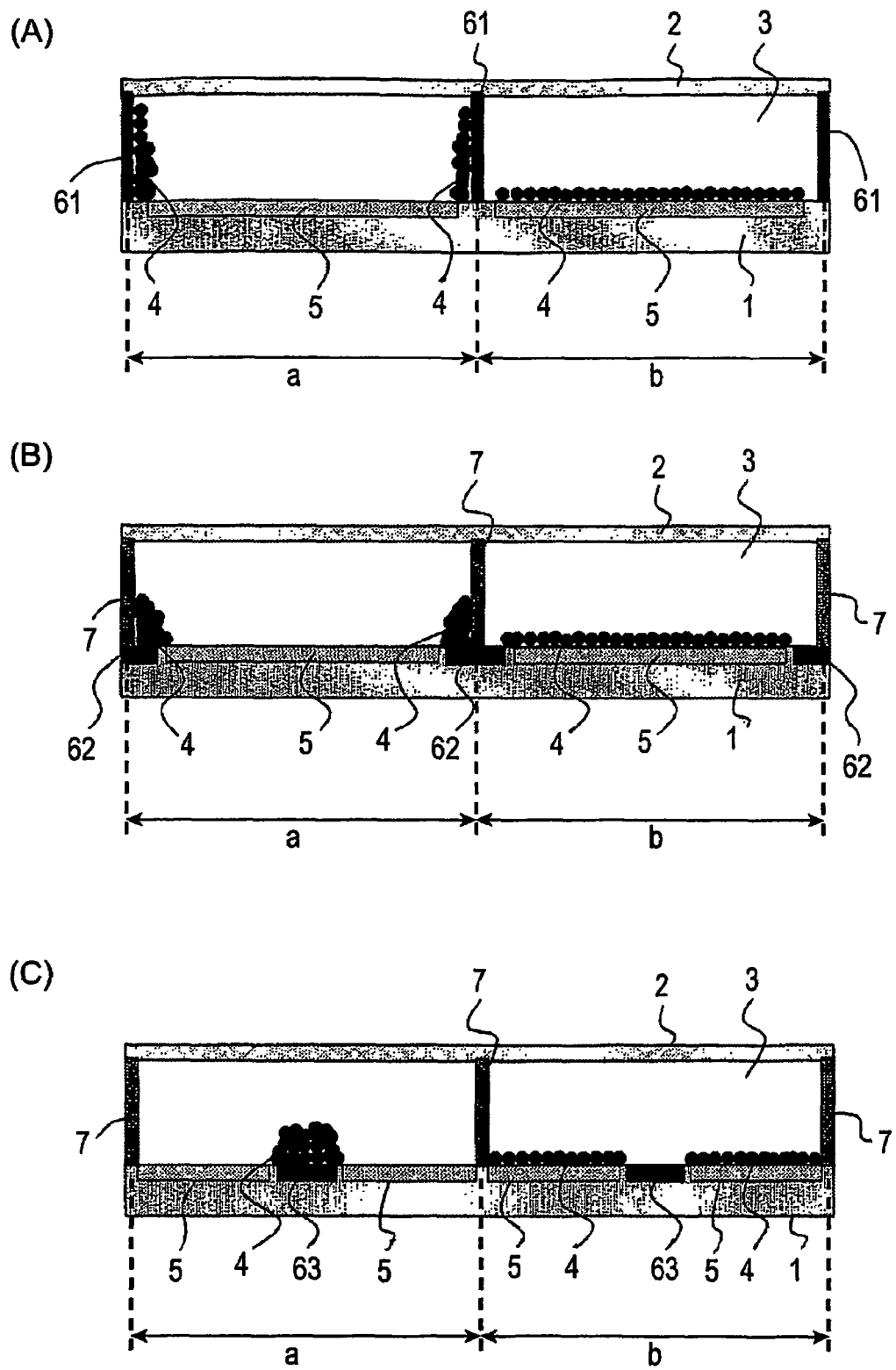
FIGS. 4(A), 4(B) and 4(C) are views showing a structure of a partition wall and a second electrode in the electrophoretic display apparatus.

Further, as shown in FIG. 4(A), the entire partition wall is used as an electrode to constitute a second electrode 61 also functioning as a partition wall. In this case, the partition wall itself may be formed of an electrode material or the second electrode 61 may be formed by surface-coating a separately prepared partition wall with an electroconductive material. The second electrode 61 or its surface may preferably colored substantially the same color as that of the electrophoretic particles 4.

In the case where the second electrode is disposed between the partition wall 7 and the first substrate 1, when it is formed under the partition wall 7, a second electrode 62 may be somewhat projected toward the first electrode 5 side as shown in FIG. 4(B). Further, it is possible to employ the electrode structures shown in FIGS. 4(A) and 4(B) in combination. The second electrode 62 or its surface may preferably be colored substantially the same color as that of the electrophoretic particles 4. Further, the partition wall 7 or its surface may also be preferably colored substantially the same color as that of the electrophoretic particles 4.

As shown in FIG. 4(C), a second electrode 63 may be formed at a central portion of pixel, not in the neighborhood of the partition wall 7. In this case, compared with the case where reflection at an identical isotropic scattering reflection layer is assumed, a directive diffuse reflection characteristic of the first electrode 5 is adjusted so that an intensity of reflected light moving toward a position at which the electrophoretic particles 4 are collected during a bright-state display (at pixel a) is low and an intensity of reflected light moving toward an area other than the position, i.e., toward the observation surface is high. The second electrode 63 or its surface may preferably be colored substantially the same color as that of the electrophoretic particles 4.

Further, the partition wall 7 or its surface may also be colored substantially the same color as that of the electrophoretic particles 4. In this case, the direction diffuse reflection characteristic of the first electrode 5 is adjusted so that an intensity of reflected light moving toward the partition wall 7 during the bright-state display is low and an intensity of reflected light moving toward an area other than the partition wall 7, i.e., toward the observation surface is large.

The second electrode may be disposed between the partition wall 7 and the second substrate 2. In either case described with reference to FIGS. 4(A), 4(B) and 4(C), when the second electrodes 61, 62 and 63 are disposed adjacent to the insulating liquid 3 in which the electrophoretic particles 4 are dispersed, their surfaces may preferably be coated with an insulating material so as not to directly contact the insulating liquid 3 and the electrophoretic particles 4.

Second Embodiment

Figure 5:
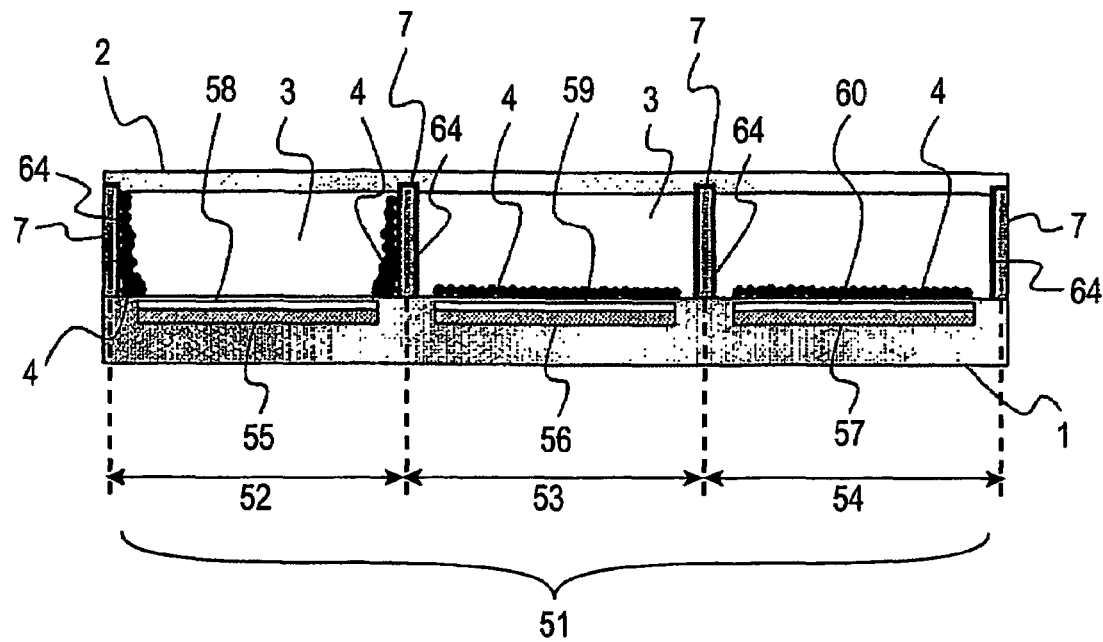
FIG. 5 is a view showing a structure of pixels of a color electrophoretic display apparatus as another embodiment of a particle movement type display apparatus according to Second Embodiment of the present invention.

FIG. 5 is a view showing a structure at pixels of a color electrophoretic display apparatus as an embodiment of a particle movement type display apparatus according to Second Embodiment of the present invention.

In the case of effecting the color display, in addition to use of a desired color electrophoretic particles as the electrophoretic particles 4 described in First Embodiment (FIG. 1), it is possible to use substantially black electrophoretic particles 4 and an area, where a first electrode 5 is disposed, colored a desired color in combination.

As the coloring method of the area where the first electrode 5 is disposed, it is possible to use a method wherein the first electrode 5 itself is colored, a method wherein a colored layer is further disposed on the first electrode 5, a method wherein only a specific wavelength light is selectively reflected by use of the first electrode 5 itself or a hologram diffusion member formed thereon, and a method wherein a light diffusion layer formed on the first electrode is colored in the case of using a mirror surface electrode and the light diffusion layer in combination. Further, on the second substrate side, it is possible to dispose a conventionally known color filter.

FIG. 5 shows such a pixel structure of the electrophoretic display apparatus that color display is effected by use of pixel comprising sub-pixels of red (R), green (G) and blue (B) which are two-dimensionally arranged. As shown in FIG. 5, a pixel 51 is constituted by a first sub-pixel 52, a second sub-pixel 53, and a third sub-pixel 54 and a partition wall 7 is formed at a sub-pixel boundary portion between adjacent sub-pixels.

At each of the sub-pixels 52-54 (for R, G and B), first electrodes 55-57 each corresponding to the first electrode 5 shown in FIG. 1 and having a direction diffuse reflection characteristic are formed, respectively. Further, on these first electrodes 55-57, semi-transparent red layer 58, green layer 59, and blue layer 60 are formed, respectively.

Further, as an electrode corresponding to the second electrode 6 shown in FIG. 1, a second electrode 64 is formed at the surface of a partition wall 7. As already described above, in the case where the surface of the second electrode 64 is disposed adjacent to an insulating liquid 3 in which electrophoretic particles 4 are dispersed, it may preferably be coated with an unshown insulating material so as not to directly contact these members 3 and 4. Further, the second electrode 64 itself or its surface may preferably be colored substantially the same color as that of the electrophoretic particles 4.

By doing so, e.g., in the case of using the black electrophoretic particles 4, the electrophoretic particles 4 in each sub-pixel are moved and distributed along the first electrode (55, 56 or 57) at the sub-pixel (52, 53 or 54). As a result, the black pixel is visually identified.

On the other hand, when the electrophoretic particles 4 are collected on the surface of each of the sub-pixels 52-54, the pixel locks white. Further, when only the electrophoretic particles 4 in the second and third sub-pixels 53 and 54 are collected on the first electrodes, the rod (first) sub-pixel 52 is visually identified. Similarly, it is possible to display various colors including green and blue by color mixing of R, G and B.

In the electrophoretic display apparatus for effecting color display by color mixing with the use of the sub-pixels 52-54 having the colored layers 58-60 of R, G and B, respectively, when the display apparatus is viewed as a pixel unit, an important factor is that a utilization of each color light is lowered to ⅓ when an ideal colored layer, which completely absorbs other two colors, is used. Accordingly, during white display, compared with a reflectance of a reflection plate (white scattering layer) for ideal isotropic scattering, the resultant reflectance is lowered to ⅓ in principle. On the other hand, it is possible to enhance the reflected light intensity in a principal observation direction by use of a directive diffuse reflection layer. As a result, when the display state is observed from this direction, the reflectance is increased, thus realizing a bright reflection type color display closer to printing display using paper.

With respect to the colors of the colored layers, it is possible to employ a combination of cyan (C), magenta (M) and yellow (Y), instead of R, G and B. Further, a pattern of the sub-pixel arrangement for these colors is not particularly limited. Accordingly, various arrangement patterns conventionally known in the art can be utilized.

Figure 6:
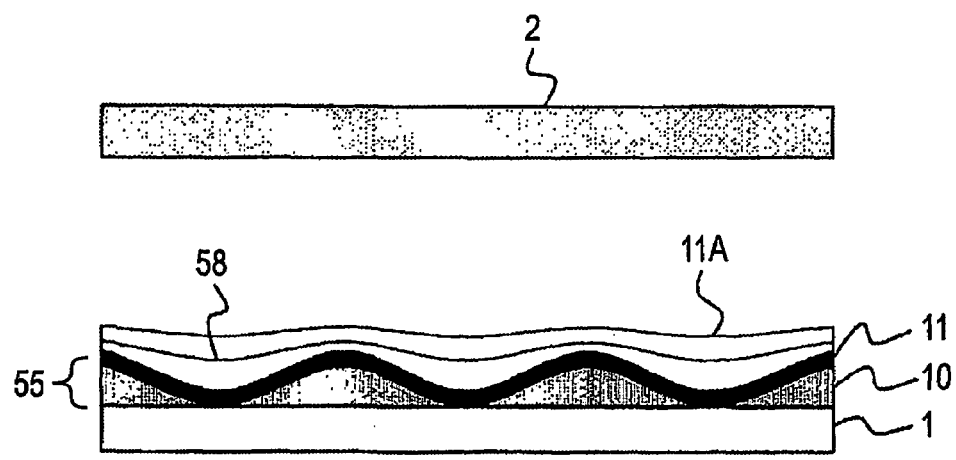
FIG. 6 is a view showing a structure of a first electrode and a colored layer and its neighborhood at a sub-pixel in the color electrophoretic display apparatus.

Incidentally, these is a possibility that a distance between the first electrodes 55-57 and the electrophoretic particles 4 is made large by forming the colored layers 58-60 on the first electrodes 55-57, respectively, thus causing an increase in drive voltage or an increase in operation time. In order to solve the problems, similarly as in the case of FIG. 3, a transparent electrode layer 11A may be formed on the colored layer 58 as shown, e.g., in FIG. 6. The transparent electrode layer 11A, when disposed adjacent to the insulating liquid 3 in which the electrophoretic particles 4 are dispersed, may preferably be surface-coated with an unshown insulating material so as not to directly contact these members 3 and 4. FIG. 6 only shows the structure of the first electrode 55 but other first electrodes 56 and 57 may also have the same structure as that of the first electrode 55.

In the partition movement type color display apparatus, as described in First Embodiment, the shape and position of the second electrode may be modified appropriately, e.g., such that it is disposed at least a part of the partition wall 7 itself, at least a part in the partition wall 7, between the partition wall 7 and the first substrate 1, between the partition wall 7 and the second substrate 2, or a portion determined by combinations thereof.

Further, in the particle movement type color display apparatus, as described in First Embodiment, it is possible to further dispose a front scattering layer on the second substrate 2 side. In addition, it is also possible to provide a semi-transparent particle movement type color display apparatus by using semi-transparent second electrodes 55-57, a substantially transparent first substrate 1, and a backlight disposed below the first substrate 1.

Third Embodiment

Figure 7:
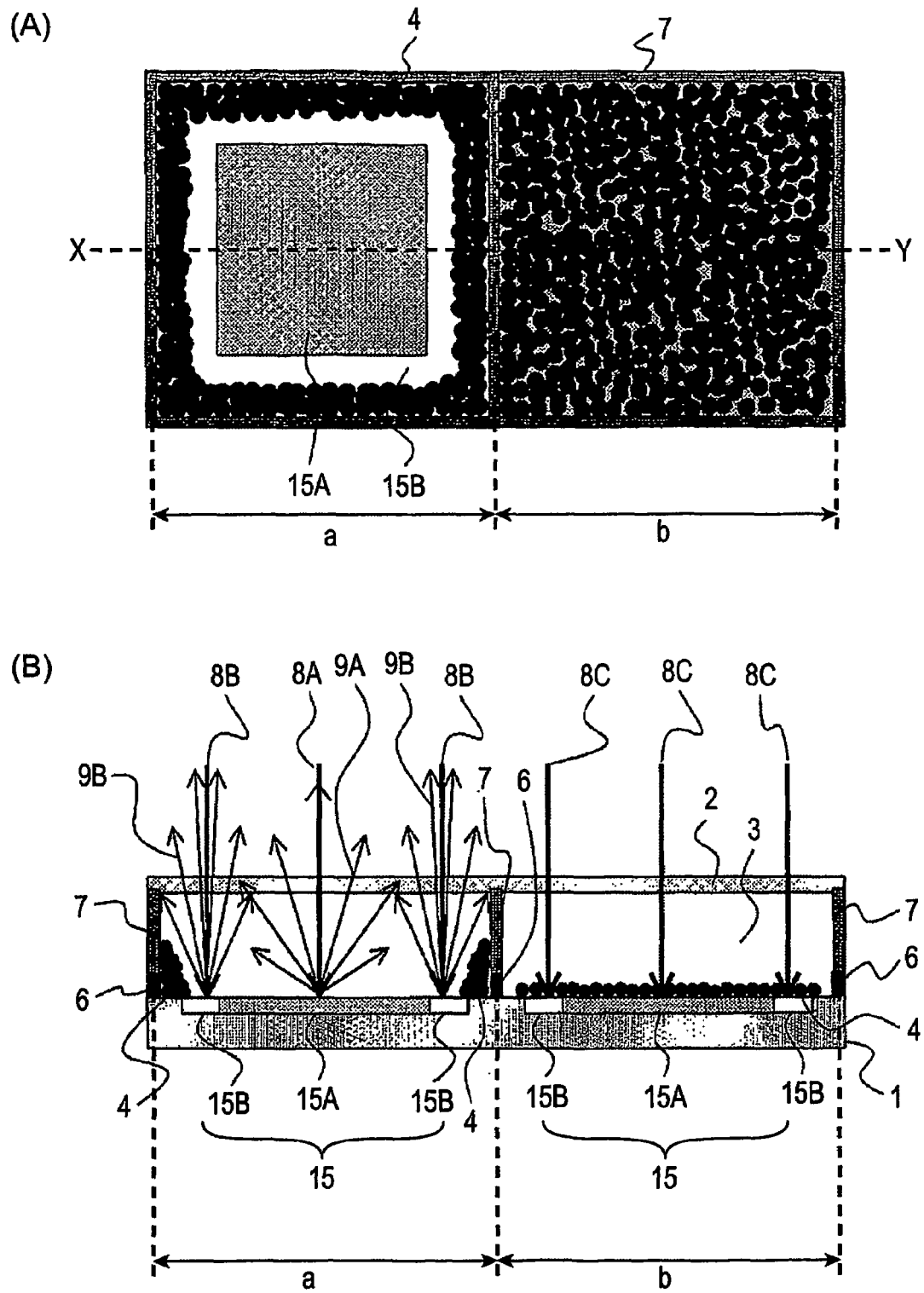
FIGS. 7(A) and 7(B) are views showing a structure of adjacent two pixels of an electrophoretic display apparatus as another embodiment of a particle movement type display apparatus according to Third Embodiment of the present invention.

FIGS. 7(A) and 7(B) are views showing a structure of adjacent two pixels of an electrophoretic display apparatus as an embodiment of a particle movement type display apparatus according to Third Embodiment of the present invention, wherein FIG. 7(A) is a plan view of the pixels and FIG. 7(B) is a sectional view thereof along X-Y line indicated in FIG. 7(A). The structure of the pixels is substantially identical to that in First Embodiment described with reference to FIGS. 1(A) and 1(B) except for the following point.

Different from the first electrode 5 shown in FIG. 1(B), a first electrode 15 in this embodiment comprises a central electrode portion 15A located at a central portion of each of pixels a and b and partition wall side electrode portions 15B located in the neighborhood of partition walls 7, as shown in FIG. 7(B). These central and partition wall side electrode portions 15A and 15B have a diffuse reflection function but are different in reflection characteristic described later. This electrode surfaces, when disposed adjacent to the insulating liquid 3 in which the electrophoretic particles 4 are dispersed, may preferably be coated with an unshown insulating material so as not to directly contact these members 3 and 4.

In FIGS. 7(A) and 7(B), a first pixel a is in such a state that the electrophoretic particles 4 are collected on the second electrode 6 side (partition wall side), i.e., on the partition wall-side electrode side. In this state, incident light fluxes 8A and 8B entering the central electrode portion 15A of the pixel a (closed space) and the partition wall sides, respectively, are reflected by the central electrode portion 15A and the partition wall side electrode portions 15B, respectively, to provide a bright display state. On the other hand, a pixel b is in such a state that the electrophoretic particles 4 are moved along and diffused over the first electrode 5 (comprising the central electrode portion 15A and the partition wall side electrode portions 15B). In this state, the incident light fluxes 8C are generally absorbed by the electrophoretic particles 4 to provide a dark display state.

In this embodiment, in the first electrode 15 having the defuse reflection function, the central electrode portion 15A constitutes a diffuse reflection area where a directivity of reflected light is relatively weak and the partition wall side electrode portions 15B constitute diffuse reflection areas where a directivity of reflected light is relatively strong. As a result, the incident light 8A entering the central electrode portion 15A in the first pixel a (for bright-state display) is reflected by the central electrode portion 15A having the weak directivity to provide reflected light fluxes 9A scattered in a broad range, so that a wide viewing angle can be retained. Further, even when the central electrode portion 15A has such a weak direction diffuse reflection function that the reflected light moves in a relatively broad range, it is apart from the partition walls 7 and the position at which the electrophoretic particles 4 are collected, so that a proportion of the reflected light entering the partition walls 7 and the position can be kept at a relatively low level.

On the other hand, incident light fluxes 8B entering the partition wall side electrode portions 15B have the strong directivity, so that they provide reflected light fluxes 9B scattered in a narrow range. In correspondence therewith, a proportion of the reflected light fluxes 9B moving toward the electrophoretic particles 4, collected in the neighborhood of the partition walls 7, and the partition walls 7 is decreased. As a result, compared with the case where the first electrode is constituted only by use of an electrode having a relatively weak directive diffuse reflection function, an absorption proportion of the reflected light fluxes 9B at a light absorbing portion comprising the electrophoretic particles 4 and the partition walls 7 is decreased to increase a reflectance of the entire pixel as a whole. The partition walls 7 and their surfaces may preferably be colored substantially the same color as the electrophoretic particles 4 similarly as in First Embodiment described above.

As described above, the first electrode 15 is constituted by the central electrode portion 15A having the weak directive diffuse reflection function and the partition wall side electrode portions 15B having the strong directive diffuse reflection function, i.e., constituted by two types of electrode portions (areas) 15A and 15B. In other words, at each of the pixels a and b, the central portion is a weak directive diffuse reflection area and the partition wall side portions are a strong directive diffuse reflection area. As a result, a reflectance at the entire pixel can be increased in a relatively broad viewing angle range, as a whole, thus permitting bright display.

The central electrode portion 15A and the partition wall side electrode portions 15B of the first electrode may be formed in the same manner as the first electrode 5 described in First Embodiment.

For example, with reference to the structures of the first electrode (diffuse reflection layer) having the diffuse reflection function, the structures shown in FIGS. 2(B) and 2(C) are designed to have a directivity larger than that of the structure shown in transparent electrode may further be disposed on colored layers 58-60.

In this embodiment, irrespective of the white/black and color display structures, it is possible to adopt various modifications of the partition wall and the electrode structures described in First and Second Embodiments. Further, the front scattering layer may also be used and the semi-transparent particle movement type display. apparatus may be prepared by using a semi-transparent first electrode, a substantially transparent first substrate 1, and a backlight disposed below the first substrate 1, in combination.

Fourth Embodiment

In Third Embodiment, the first electrode is constituted by the two types of electrode portions having different diffuse reflection functions but the present invention is not restricted thereto and may use a first electrode having three or more different diffuse reflection functions.

Figure 9:
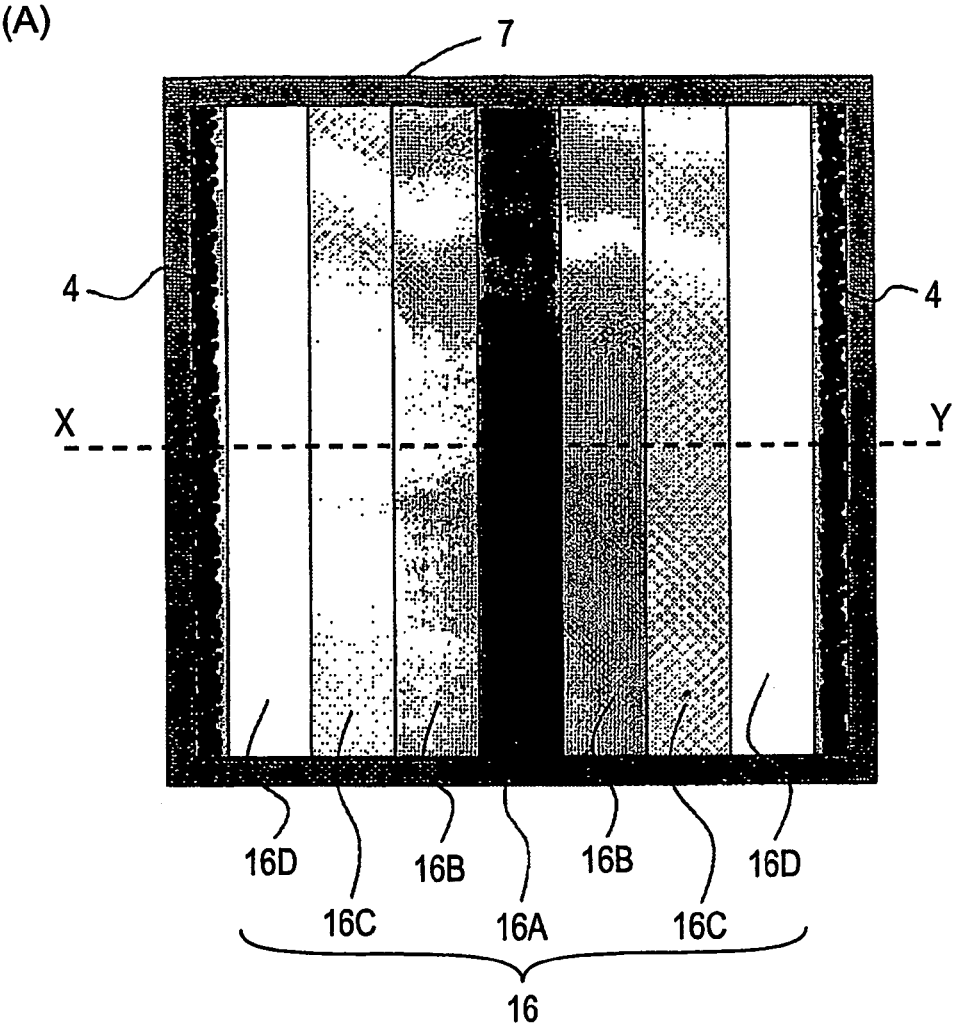
FIGS. 9(A) and 9(B), FIGS. 10(A) and 10(B), FIG. 11, and FIG. 12 are views showing structures of pixels as other embodiments of the particle movement-type display apparatuses according to Fourth Embodiment, Fifth Embodiment, Sixth Embodiment, and Seventh Embodiment, respectively, of the present invention.
Figure 9:
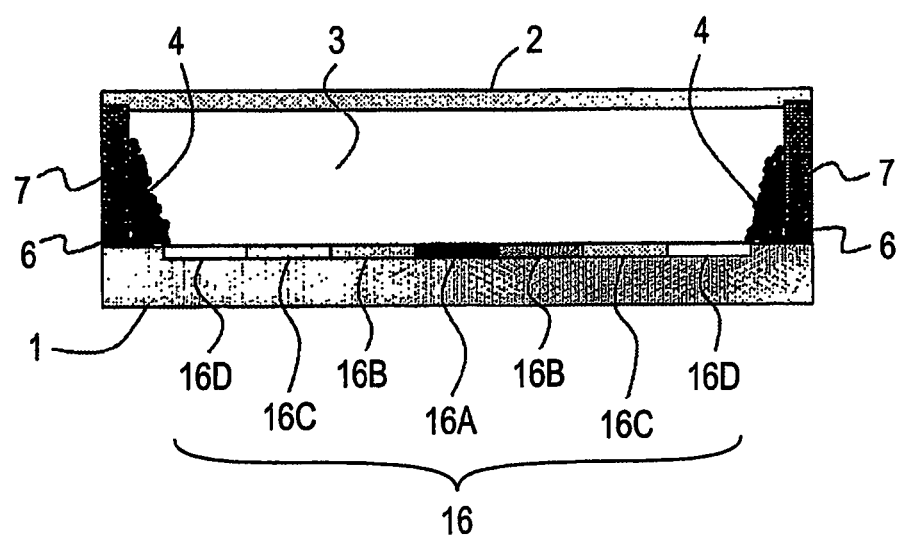

In Fourth Embodiment, as shown in FIGS. 9(A) and 9(B), a first electrode 16 comprises four electrode portions 16A, 16B, 16C and 16D which constitute four directive areas having different directivities. The first electrode 16 has such a diffuse reflection function that the directivities of the electrode portions 16A-16D are gradually FIG. 2(A). When the central electrode portion 15A has the structure of FIG. 2(A) and the partition wall side electrode portions 15B have the structure of FIG. 2(B) or FIG. 2(C), it is possible to form two types of electrode portions (areas) 15A and 15B which are different in directivity.

Further, the partition wall side electrode portions 15B may have the structures of FIGS. 2(D) or 2(E), whereby a proportion of reflected light moving toward the partition walls 7 or the position at which the partition walls 4 are collected during the bright-state display.

Figure 8:
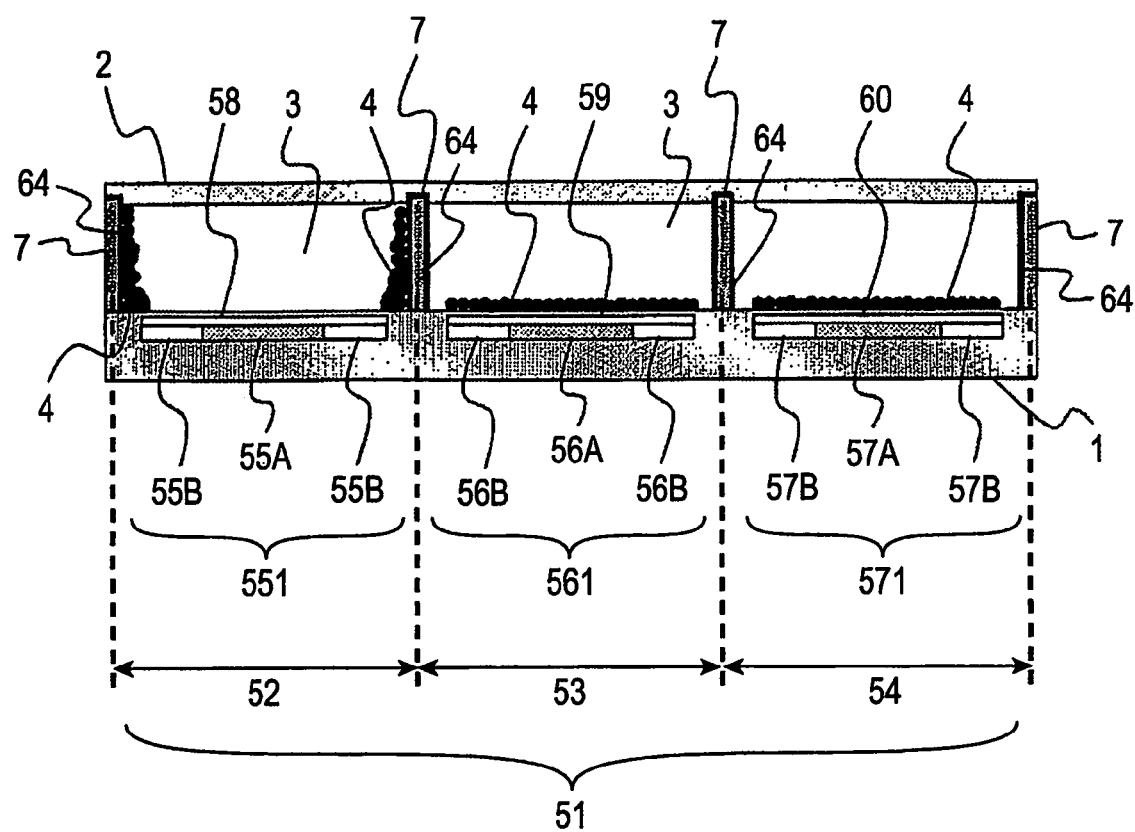
FIG. 8 is a view showing a structure of pixels as another embodiment of the particle movement type display apparatus according to Third Embodiment of the present invention.

On the basis of the above described structures in this embodiment, it is possible to provide a particle movement type color display apparatus similarly as described in Second Embodiment. FIG. 8 shows a structure thereof compared with the structure shown in FIG. 5 (Second Embodiment), the first electrodes 55-57 are changed to first electrodes 551, 561 and 571 each comprising a combination of a central electrode portion (55A, 56A or 57A) having such a diffuse reflection function that a directivity of reflected light is relatively weak and partition wall side electrode portions (55B, 56B or 57B) having such a diffuse reflection function that a directivity of reflected light is relatively strong. In this embodiment, similarly as in Second Embodiment, a scattering layer may also be used and the semi-transparent particle movement type display apparatus may be prepared by using a semi-transparent first electrode, a substantially transparent first substrate 1, and a backlight disposed below the first substrate 1, in combination.

Fifth Embodiment

Figure 10:
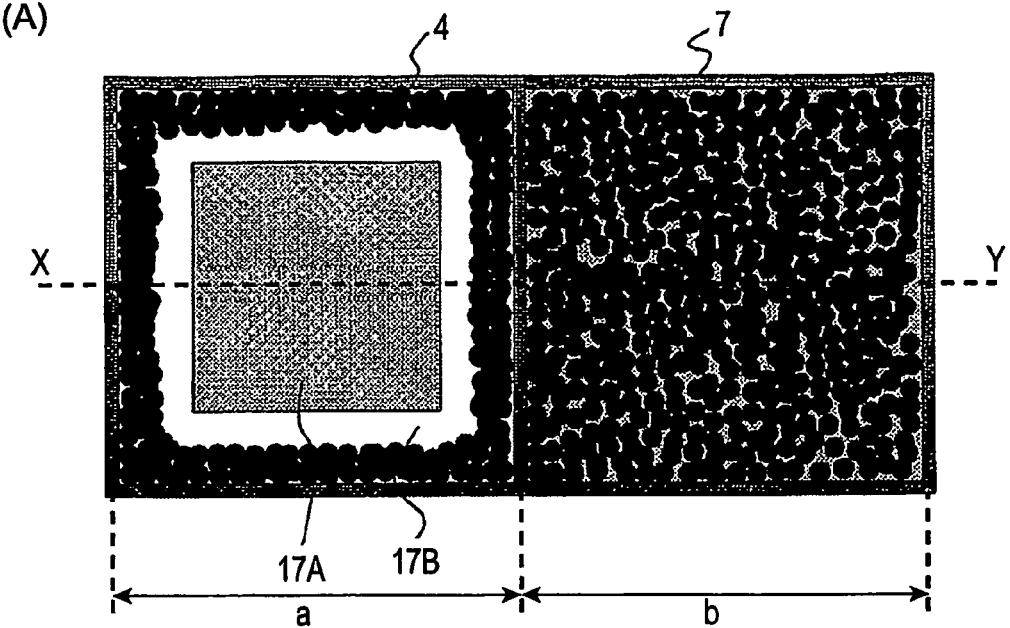
Figure 10:
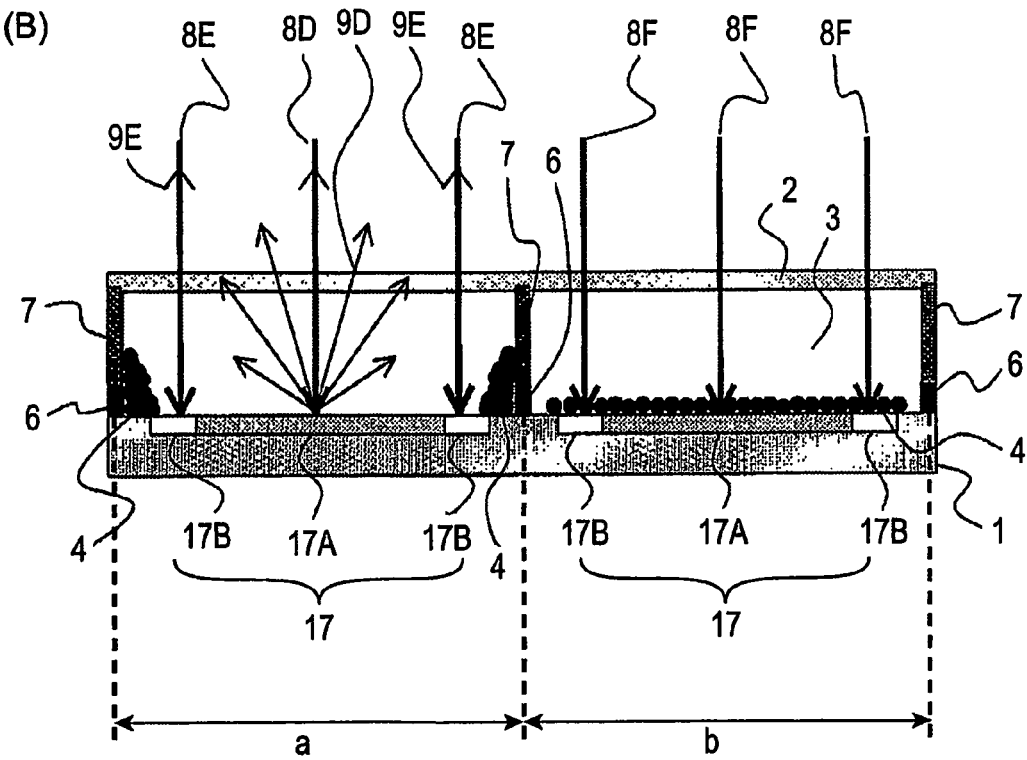

In Third and Fourth Embodiments, in order to increase the directivity of the diffuse reflection. layer close to the partition wall and/or the particle collecting portion during the bright-state display component with an area other than the portions close to the partition wall and the particle collecting portion, e.g., in Third Embodiment, the first electrode 15 is provided with two types of the electrode portions (areas) 15A and 15B including the central electrode portion 15A constituting the weak directivity diffuse reflection area and the partition wall side electrode portions 15B constituting the strong direction diffuse reflection area. However, the present invention is not restricted thereto and may employ such an electrode structure, as shown in FIGS. 10(A) and 10(B), that a first electrode 17 comprises a central electrode portion 17A having a relatively weak directive diffuse reflection function for scattering incident light at a pixel central portion and partition wall side electrode portions 17B increased from a central portion to a partition wall side portion. More specifically, the directivity of the electrode portions 16D close to the partition walls 7 is strongest and the directivity at the central electrode portion 16A is weakest. Between the electrode portions 16D and 16A, the directivity is changed stepwise along the electrode portions 16C and 16C.

In FIGS. 9(A) and 9(B), the first electrode 16 has different directive areas constituted by stripe-shaped electrode portions 16A to 16D but may have other shapes, such as a concentric-circle shape and a concentric-rectangular shape, so long as the directivity of the diffuse reflectivity layer close to the partition wall and/or the position at which the electrophoretic particles are collected during the bright-state display, is made stronger than that in an area other than the portions close to the partition wall and the position. Further, the change in directivity may also be continuous, not stepwise.

On the basis of the structure according to this embodiment, it is possible to provide the particle movement type color display apparatuses was described in Second and Third Embodiments. Further, it is possible to adopt various modifications of the partition wall and the electrode structures described in First and Second Embodiments. Further, the front having a substantial mirror surface (metal reflection surface) in the neighborhood of partition walls 7. Other members or means constituting the electrode structure are identical to those shown in FIGS. 7(A) and 7(B).

In the embodiment structure in this embodiment, as shown in FIG. 10(B), an incident light flux 8D entering the central electrode portion 17A having the diffuse reflection function is reflected thereby to provide reflected light fluxes 9D scattered in a book range to retain a wide viewing angle. Further, incident light fluxes 8E entering the partition wall side electrode portions 17B is mirror-reflected by the reflection surface to little move toward the electrophoretic particles 4 collected close to the partition walls 7 to increase its reflectance. Incidentally, when the partition wall side electrode portions 17B of the first electrode 17 have a mirror surface, metal feeding of the first electrode 17 is strongly experienced by the observer in some cases. In order to obviate the metal feeling, as described above, a front scattering layer may be disposed on the second substrate side.

On the basis of the structure according to this embodiment, it is possible to provide the particle movement type color display apparatuses was described in Second and Third Embodiments. Further, it is possible to adopt various modifications of the partition wall and the electrode structures described in First and Second Embodiments. Further, the front scattering layer may also be used and the semi-transparent particle movement type display apparatus may be prepared by using a semi-transparent first electrode 17, a substantially transparent first substrate 1, and a backlight disposed below the first substrate 1, in combination.

Sixth Embodiment

Figure 11:
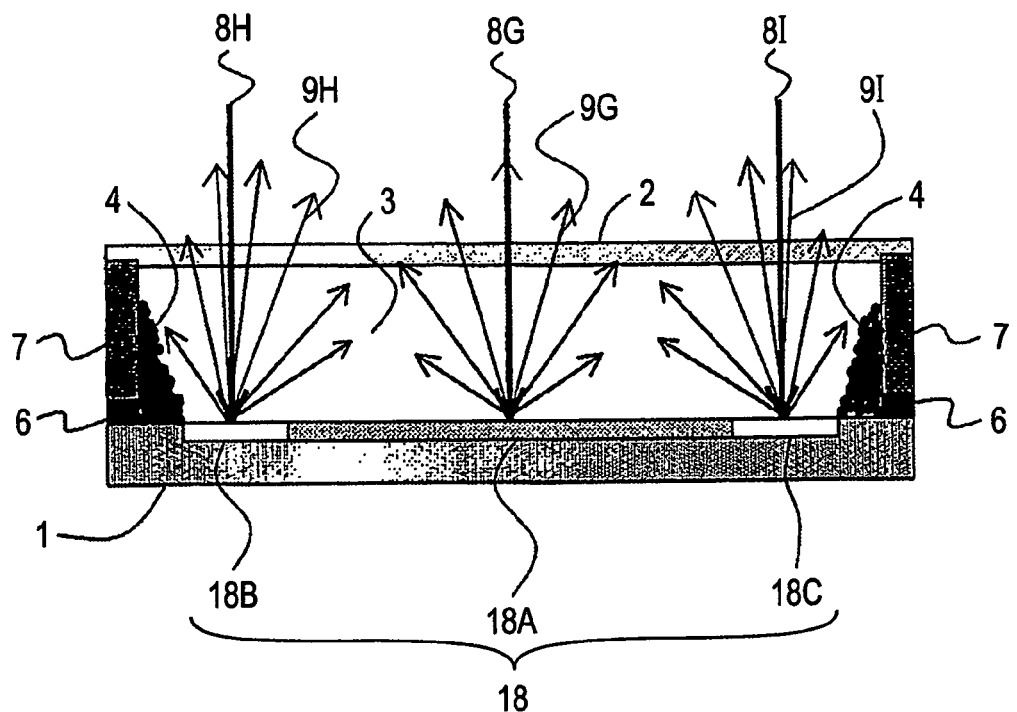

FIG. 11 shows an embodiment of a particle movement type display apparatus according to Sixth Embodiment of the present invention, wherein a pixel structure placed in a bright-display state is shown. In Third Embodiment, with respect to the directivity, the first electrode is designed to have two types of diffuse reflection functions but it is also possible to change a symmetry with respect to an angular distribution of reflected light intensity as in this embodiment.

Hereinbelow, a difference of this embodiment from Third Embodiment (FIGS. 7(A) and 7(B)) will be described.

In place of the first electrode 15 shown in FIG. 7(B), a first electrode 18 comprising a central electrode portion 18A located at a central pixel portion, and partition wail side electrode portions 18B and 18C located close to partition wall 7 and collecting portions of electrophoretic particles 4 is used in this embodiment. A position is designed so that a symmetry with respect to an angular distribution of reflected light intensity is different between these electrodes. The surface of the electrode 18, disposed adjacent to an insulating liquid 3 in which the electrophoretic particles 4 are dispersed, may preferably be coated with an unshown insulating material so as to directly contact these members 3 and 4.

In FIG. 11, with respect to an angular dependence of intensity of reflected light fluxes 9G to 9I for incident light fluxes 8G to 8I incident from a direction normal to the observation surface parallel to the substrate surface, at the partition wall side electrode portions 18B and 18C, the reflected light intensity has an asymmetrical distribution (9H, 9I) with respect to the normal direction (to the observation surface) and the distribution is locarized toward a direction of the pixel central portion. As a result, a proportion of the reflected light moving toward the partition wall or the position at which the electrophoretic particles are collected is decreased and it becomes possible to effect bright reflection type display. As a reflection layer structure for providing such an asymmetrical reflected light intensity distribution, it is possible to use, e.g., the structure shown in FIGS. 2(E). On the other hand, at the central electrode portion 18A, the symmetrical angular distribution (9G) with respect to the normal direction similarly as in the above described respective embodiments, thus leading to an improvement in viewing angle.

The change in symmetry of angular distribution of the reflected light intensity may be realized stepwise or continuously by use of three or more types of reflection layers in combination; not the two types of the reflection layers, similarly as in Fourth Embodiment described above.

On the basis of the structure according to this embodiment, it is possible to provide the particle movement type color display apparatuses was described in Second and Third Embodiments. Further, it is possible to adopt various modifications of the partition wall and the electrode structures described in First and Second Embodiments. Further, the front scattering layer may also be used and the semi-transparent particle movement type display apparatus may be prepared by using a semi-transparent first electrode 18, a substantially transparent first substrate 1, and a back light disposed below the first substrate 1, in combination.

Seventh Embodiment

Figure 12:
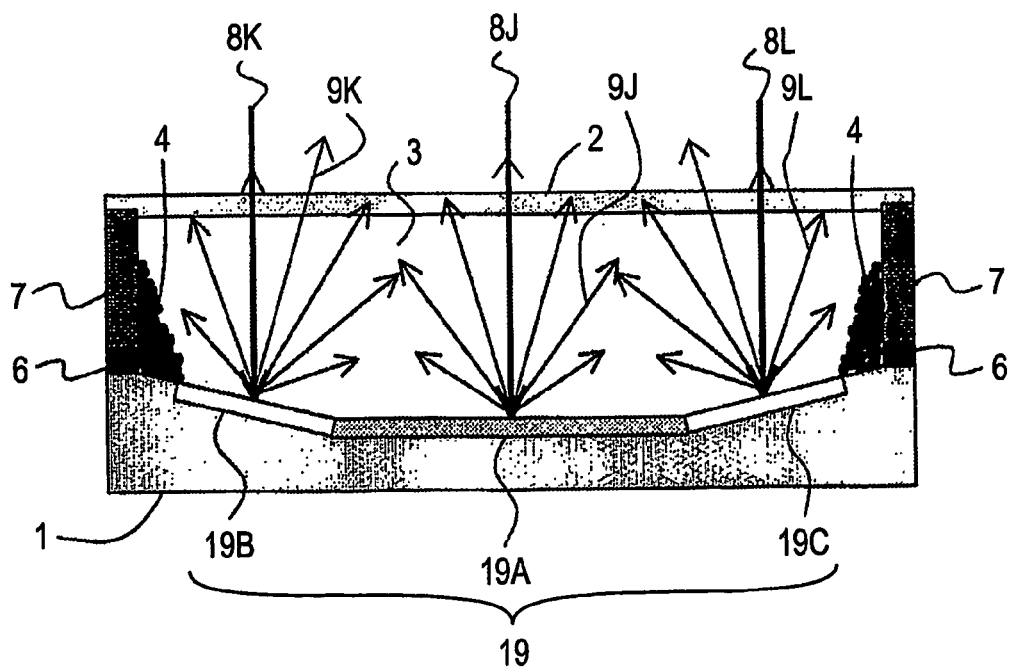

FIG. 12 is a view showing a cross-sectional structure of a pixel placed in a bright-display state in an electrophoretic display apparatus as an embodiment of a particle movement type display apparatus according to Seventh Embodiment of the present invention. In First to Sixth Embodiments, any first electrode is formed substantially in parallel with the first substrate surface but in this embodiment, a first electrode 19 is inclined upward in a direction from a pixel central portion to a partition wall 7.

Instead of the first electrode 15 shown in FIG. 7(B) (Third Embodiment), the first electrode 19 in this embodiment comprises a central electrode portion 19A located at the pixel central portion and inclined electrode portions 19B and 19C each having an upward slope located toward a partition wall 7 and a position at which electrophoretic particles 4 are collected. The first electrode 19 surface, when disposed adjacent to an insulating liquid 3 in which the electrophoretic particles 4 are dispersed, may preferably be coated with an insulating material (not shown).

With respect to reflected light fluxes 9J to 9L for incident light fluxes 8J to 8L from a direction of a normal to the observation surface parallel to the substrate surface, at the inclined electrode portions 19B and 19C, a proportion of reflected light moving toward the partition wall 7 and the electrophoretic particle collecting position is decreased to effect b right reflection type display. The reflection characteristic of the inclined electrode portions 19B and 19C may be provided only by disposing on an inclined surface a material having the same reflection characteristic as that of the central electrode portion 19A (i.e., a symmetrical angular distribution of reflected light intensity for the incident light incident from the observation surface normal direction). However, as described in the above Embodiments, a directivity or asymmetry of the reflected light intensity distribution may be increased compared with the central electrode portion 19A. Further, the inclined electrode portions 19B and 19C may have a mirror surface.

On the basis of the structure according to this embodiment, it is possible to provide the particle movement type color display apparatuses was described in Second and Third Embodiments. Further, it is possible to adopt various modifications of the partition wall and the electrode structures described in First and Second Embodiments. Further, the front scattering layer may also be used and the semi-transparent particle movement type display apparatus may be prepared by using a semi-transparent first electrode 19, a substantially transparent first substrate 1, and a backlight disposed below the first substrate 1, in combination.

Hereinbelow, the present invention will be described more specifically based on Examples.

Example 1

An electrophoretic display apparatus shown in FIGS. 7(A) and 7(B) is prepared.

A size of each of pixels a and b is 100×100 microns. A first substrate 1 comprises a 1.1 mm-thick glass substrate. At a boundary between the pixels a and b, a partition wall 7 having a width 7 having a width of 5 microns and a height of 18 microns is disposed. A 0.1 micron-thick first electrode 15 having a width of 90 microns is disposed at a central portion of each of the pixels a and b. The first electrode 15 include a central electrode portion 15A consisting of a 75 microns-square area and a partition wall side electrode portion 15B in its surrounding area. Further, a 0.1 micron-thick second electrode 6 having a width of 5 microns is disposed at a pixel boundary portion (between the partition wall 7 and the first substrate 1).

Next, a method of manufacturing the electrophoretic display apparatus will be described.

First of all, onto the first substrate 1, a 1.2 micron-thick layer of a photosensitive resin (trade name: "OMR83-20Cp", mfd. by Tokyo Ohka Kogyo K.K.) for forming an uneven layer 10 (as shown in FIG. 2(A)) is applied, followed by patterning of a convex of the uneven layer 10 through photolithography and wet development so that an area for the central electrode portion 15A of the first electrode 15 occupies 50% of the photosensitive resin per one pixel and an area for the partition wall side electrode portion 15B occupies 30% of the photosensitive resin per one pixel. The resultant pattern is then subjected to heat treatment at 120° C. for 30 min.

Next, on the first substrate 1 provided with the uneven layer 11, a 150 nm-thick metal layer 11 of aluminum is formed (as shown in FIG. 2(A)), followed by a patterning through photolithography and met etching to provide the central electrode portion 15A and the partition wall side electrode portion 15B of the first electrode 15. On the first electrode 15 formed on the first substrate 1, an insulating resin (acrylic resin) is applied and heat-treated. Then, a titanium layer is formed thereon and subjected to patterning through photolithography and dry etching to provide a second electrode 6. Next, on the second electrode 6, a photosensitive epoxy resin is applied and subjected to patterning through light exposure and wet etching to form a partition wall 7. Thereafter, a layer of a black matrix material is formed and subjected to patterning through photolithography and wet etching to remove the black matrix layer located on the first electrode 15.

In a spacing (closed space) defined by the partition walls 7 and the first and second substrates 1 and 2, an insulating liquid 3 and electrophoretic particles 4 are filled. The insulating liquid 3 is isoparaffin (trade name: "Isopar", mfd. by Exxon Corp.) and the electrophoretic particles 4 are particles of carbon black-containing polystyrene-polymethyl methacrylate copolymer resin (particle size: 1-2 microns). It is paraffin, a charge control agent of succinimide (trade name: "OLOA 1200", mfd. by Chevron Corp.) is contained.

On the other hand, the second substrate 2 comprises a 25 microns-thick polyethylene terephthalate film and onto which an ultraviolet curable resin layer (sealing layer) of a mixture principally comprising polyethylene glycol methacrylate is applied.

The second substrate 2 is pressed against the first substrate 1 so that the curable resin layer contacts the insulating liquid 3, followed by irradiation with ultraviolet rays to cure the curable resin layer simultaneously with bonding of the second substrate 2 to the partition wall 7. To the resultant structure, an unshown voltage application circuit is connected, thus preparing an electrophoretic display apparatus.

A drive voltage of +30 V is applied to the first electrode 15 of the thus prepared electrophoretic display apparatus and a drive voltage of 0 V is applied to the second electrode 6 thereof, for 100 ms. Alternatively, a drive voltage of −30 V is applied to the first electrode 15 and a drive voltage of 0 V is applied to the second electrode 6, for 100 ms. As a result, the electrophoretic particles 4 are moved to the first electrode 15 or the second electrode 6 without being left on the previous position.

Further, a reflectance in a direction of an incident angle of zero degrees (i.e., a normal to the observation surface) when light is incident from a position at an angle of 30 degrees on the basis of the observation surface normal direction, is about 60%, thus providing a good contrast.

Example 2

An electrophoretic display apparatus shown in FIGS. 9(A) and 9(B) is prepared in the same manner as in Example 1 except that the first electrode 15 is changed to a first electrode 16 which comprises four types of directive reflection layers and is disposed only on opposite two sides of each pixel.

The patterning of areas for the first electrode 16 is performed so that an area for the electrode portion 16A occupies 50% of a proportion of the photosensitive resin per one pixel, an area for an electrode portion 16B occupies 40%, an area for an electrode portion 16C occupies 30%, and an area of an electrode portion 16D occupies 20%.

A drive voltage of +30 V is applied to the first electrode 16 of the thus prepared electrophoretic display apparatus and a drive voltage of 0 V is applied to the second electrode 6 thereof, for 100 ms. Alternatively, a drive voltage of −30 V is applied to the first electrode 16 and a drive voltage of 0 V is applied to the second electrode 6, for 100 ms. As a result, the electrophoretic particles 4 are moved to the first electrode 16 or the second electrode 6 without being left on the previous position.

Further, a reflectance in a direction of an incident angle of zero degrees (i.e., a normal to the observation surface) when light is incident from a position at an angle of 30 degrees on the basis of the observation surface normal direction, is about 60%, thus providing a good contrast.

Example 3

An electrophoretic display apparatus shown in FIGS. 10(A) and 10(B) is prepared.

In the electrophoretic display apparatus, a 1.1 mm-thick glass substrate is used as a first substrate 1 and a partition wall 7 having a width of 5 microns and a height of 18 microns is formed at a pixel boundary portion.

At a central portion of each pixel, a 0.1 micron-thick first electrode 17, functioning also as a reflection layer, of an aluminum layer having a width of 90 microns. On the first electrode 17, at a pixel central portion, a light diffusion layer having a size of 60×60 microns as a central electrode portion 17A having a diffuse reflection function is formed of an acrylic resin containing titanium oxide fine particles. Thereafter, a layer of an insulating resin (acrylic resin) is applied onto the first electrode 17 and the first substrate on which the light diffusion layer is formed and heat-treated.

Then, a second electrode 6 of chromium oxide is formed in a width of 5 microns and a height of 5 microns at the pixel boundary portion (between the partition wall 7 and the first substrate 1). On the second electrode 6, a black partition wall 7 is formed by applying a photosensitive epoxy resin and subjecting it to patterning through photolithography and wet etching to remove the black matrix layer on the first electrode 17. On the second substrate 2, a front scattering layer is formed. Other members or means are prepared in the same manner as in Example 1.

A drive voltage of +30 V is applied to the first electrode 17 of the thus prepared electrophoretic display apparatus and a drive voltage of 0 V is applied to the second electrode 6 thereof, for 100 ms. Alternatively, a drive voltage of −30 V is applied to the first electrode 17 and a drive voltage of 0 V is applied to the second electrode 6, for 100 ms. As a result, the electrophoretic particles 4 are moved to the first electrode 17 or the second electrode 6 without being left on the previous position.

Further, a reflectance in a direction of an incident angle of zero degrees (i.e., a normal to the observation surface) when light is incident from a position at an angle of 30 degrees on the basis of the observation surface normal direction, is about 60%, thus providing a good contrast.

Example 4

An electrophoretic display apparatus shown in FIG. 12 is prepared in the same manner as in Example 3 except that a first electrode 19 is formed so that a central electrode portion 19A thereof is formed in a size of 60×60 microns and inclined electrode portions 19B and 19C each having a mirror surface are formed with inclination.

A drive voltage of +30 V is applied to the first electrode 19 of the thus prepared electrophoretic display apparatus and a drive voltage of 0 V is applied to the second electrode 6 thereof, for 100 ms. Alternatively, a drive voltage of −30 V is applied to the first electrode 19 and a drive voltage of 0 V is applied to the second electrode 6, for 100 ms. As a result, the electrophoretic particles 4 are moved to the first electrode 19 or the second electrode 6 without being left on the previous position.

Further, a reflectance in a direction of an incident angle of zero degrees (i.e., a normal to the observation surface) when light is incident from a position at an angle of 30 degrees on the basis of the observation surface normal direction, is about 60%, thus providing a good contrast.

Comparative Example

Figure 13:
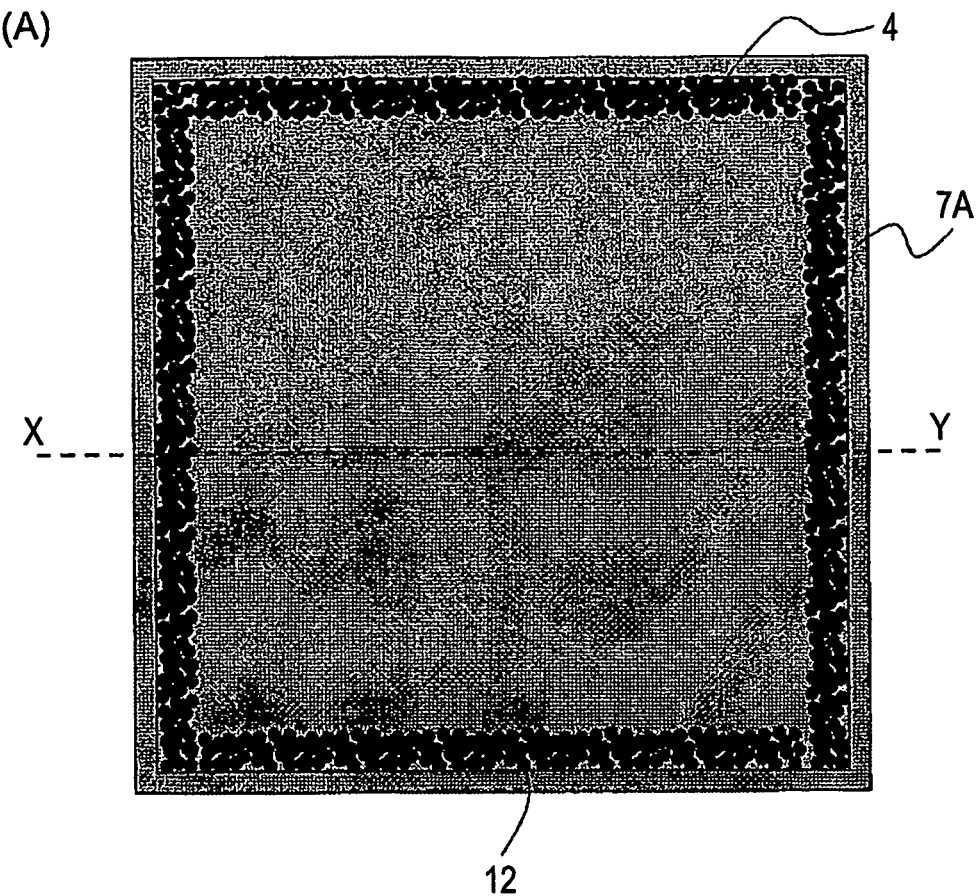
FIGS. 13(A) and 13(B) are views for illustrating an embodiment of a conventional electrophoretic display apparatus.
Figure 13:
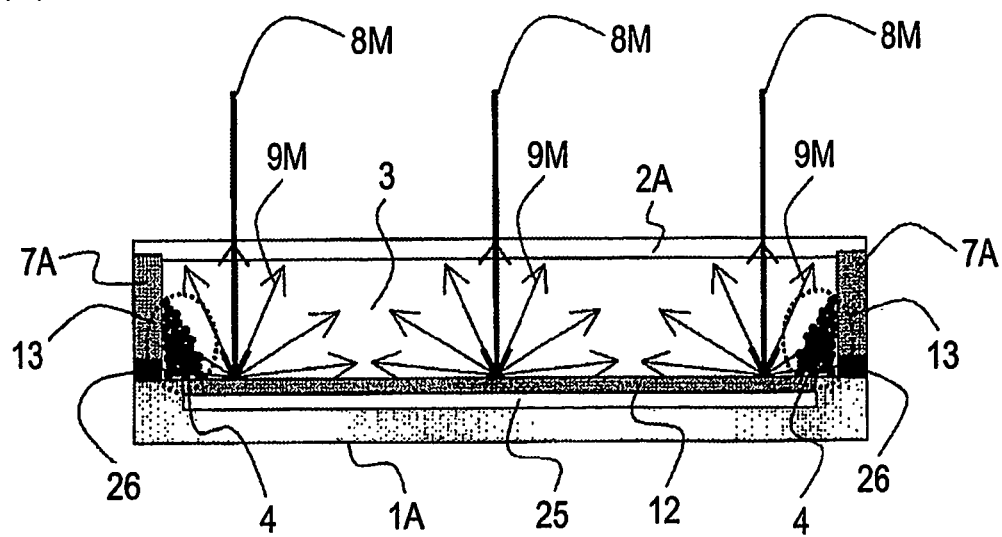

A comparative (conventional) electrophoretic display apparatus shown in FIG. 13 is prepared in the same manner as in Example 1 except that a first electrode 25 functioning also as a reflection layer is prepared on the first substrate 1 by forming a 150 nm-thick Al layer (not the photosensitive resin layer) and subjecting it to patterning through photolithography and wet etching, and that an isotropic scattering layer 12 is disposed between the first electrode 25 and the insulating liquid 3.

A drive voltage of +30 V is applied to the first electrode 25 of the thus prepared electrophoretic display apparatus and a drive voltage of 0 V is applied to the second electrode 6 thereof, for 100 ms. Alternatively, a drive voltage of −30 V is applied to the first electrode 25 and a drive voltage of 0 V is applied to the second electrode 6, for 100 ms. As a result, the electrophoretic particles 4 are moved to the first electrode 25 or the second electrode 6 without being left on the previous position.

However, a reflectance in a direction of an incident angle of zero degrees (i.e., a normal to the observation surface) when light is incident from a position at an angle of 30 degrees on the basis of the observation surface normal direction, is about 40%.

As is apparent from the results of Examples 1-4 and Comparative Example described above, the directivity of reflected light in the area of the first electrode 15, 16, 17 and 19, close to the partition wall 7, where the partition walls are collected, is increased compared with the area other than the particle collecting area, whereby the reflected light moving toward the partition wall 7 and the electrophoretic particles 4 collected on the partition wall side is decreased. As a result, during the bright-state display, the reflected light is less absorbed by the electrophoretic particles collected in the neighborhood of the partition wall 7 and it is possible to improve a resultant reflectance to permit bright display.

In the above description, the case wherein the insulating liquid 3 and the electrophoretic particles 4 are filled in the closed space defined by the partition wall 7 and the first and second substrates 1 and 2 is described. However, the present invention is not limited thereto. The insulating liquid 3 and the electrophoretic particles 4 may be disposed at each pixel in such a state that they are filled in a microcapsule. The number of the microcapsule per one is pixel may be one or two or above. Further, the electrophoretic particles 4 used are one type (single color) of electrophoretic particles but may be those including a plurality of types (colors) of electrophoretic particle.

In the above description, the electrophoretic display apparatus is used as an embodiment of the particle movement type display apparatus but the present invention may be widely applicable to various display apparatuses, wherein at least two (bright and dark) display states can be displayed by moving particles to change a reflection condition of incident light in a reflection layer, such as a dry type display apparatus which is so-called toner display wherein particles are moved in a gas without using the dispersion liquid, and a fine particle dispersion type display apparatus wherein particles dispersed in a liquid crystal are moved to provide a contrast.

Further, in the above description, the case where the plurality of electrophoretic particles are moved to the end side of the reflection layer is described but the particles may be collected at a (pixel) central portion of the reflection layer. Further, the substrate on which the particles are collected may be used as the observer's side substrate. In the case where the particles are collected in such a manner, the position of reflected light in an area close to the particle collecting portion is designed to be increased compared with that in an area other than the area close to the particle collecting portion.

Further, it is possible to provide a reflection type or semi-transparent type display apparatus by employing structures of the particle movement type display apparatuses described above in combination.

Further, the plurality of pixels having the structures described in the embodiments of the present invention may be regularly arranged two-dimensionally to provide a display apparatus by use of a drive circuit, such as a TFT circuit, in combination. In this case, there is a possibility that a source or drain electrode of the TFT is electrically connected with the first electrode of the display apparatus of the present invention. In such a case, the connection may be performed by forming an electroconductive via passing through a part of the reflection layer, as desired.

INDUSTRIAL APPLICABILITY

As described hereinabove, in the display apparatus according to the present invention, compared with the case of using an ideal isotropic scattering reflection layer, the directivity of the diffuse reflection surface is set so that reflected light fluxes of light reflected at the diffuse reflection surface, which move toward the position at which the plurality of particles are collected or the partition wall during the bright-state display, are decreased in intensity and these which move toward an area other than the position or the partition wall, i.e., toward the observation surface are increased in intensity. As a result, it becomes possible to effect bright display by improving a substantial reflectance.

The invention claimed is:
1. A display apparatus, comprising:
  a substrate on which a plurality of closed spaces are two-dimensionally disposed along a surface of said substrate,
  a plurality of light-absorbing particles contained in each of the closed spaces, and
  a reflection surface for reflecting light which enters each of the closed spaces,
  wherein said particles are moved in each closed space, between a first position at which they are diffused to cover said reflection surface and a second position at which they are collected to expose said reflection surface, to change an intensity of reflected light so as to provide a bright display state and a dark display state, wherein
  the exposed reflection surface diffuse-reflects incident light with a directivity when said particles are located at the second position, and
  wherein a light intensity of the diffuse reflection with the directivity of the exposed reflection surface has such an angular distribution that:
  (1) an amount of reflected light emitted from the reflection surface toward the second position at which said particles are collected is smaller than that thereof in the case where the reflection surface is an isotropic diffuse reflection surface, and

(2) an amount of reflected light emitted from the reflection surface toward positions other than the second position at which said particles are collected is larger than that of reflected light emitted from the reflection surface toward the second position at which said particles are collected.

2. An apparatus according to claim 1, wherein the reflection surface has a portion close to the second position at which the particles are collected, and the directivity at the portion is stronger than those at other portions of the reflection surface.

3. An apparatus according to claim 1, wherein the angular distribution of the intensity of light from the reflection surface is such that it is asymmetrical with respect to a direction of a normal to the reflection surface in an area close to the second position at which the particles are collected so as to be localized toward a direction apart from the position and that it is substantially symmetrical with respect to the normal direction in an area other than the area close to the second position.

4. An apparatus according to claim 3, wherein the reflection surface is divided into a plurality of reflection areas different in reflection characteristic from each other, and the angular distribution of the intensity of light from each of the divided reflection areas is such that it is changed stepwise or continuously from a strong level to a weak level with respect to the directivity with an increasing distance of the particles from the second position at which the particles are collected and that it is changed stepwise or continuously from a large level to a small level or no level with respect to the asymmetry with the increasing distance.

5. A display apparatus according to claim 1, wherein the reflection surface is substantially a mirror surface in an area close to the second position at which the particles are collected, and is a diffuse reflection surface in an area other than the area close to the second position.

6. An apparatus according to claim 2, wherein at least a portion of the reflection surface in an area close to the second position at which the particles are collected is inclined upward.

7. An apparatus according to claim 1, wherein at least a portion of the substrate is transparent and the reflection surface is semitransparent, and a light source is disposed below the substrate.

8. An apparatus according to claim 1, wherein the apparatus further comprises a front scattering layer disposed on an observer's side.

9. An apparatus according to claim 1, wherein in each of the closed spaces, a color filter is disposed on the reflection surface.

10. An apparatus according to claim 1, wherein in each of the closed spaces, a color filter is disposed between the reflection surface and the transparent electrode.

11. A display apparatus according to claim 1, further comprising a partition wall for dividing the closed spaces in a direction along the surface of the substrate, wherein the second position at which said particles are collected is proximate to the partition wall.

* * * * *